US009003524B2

(12) United States Patent
Baddour et al.

(10) Patent No.: US 9,003,524 B2
(45) Date of Patent: *Apr. 7, 2015

(54) SYSTEM AND METHOD FOR ANALYZING WEB CONTENT

(71) Applicant: Websense, Inc., San Diego, CA (US)

(72) Inventors: Victor L. Baddour, San Diego, CA (US); Stephan Chenette, Laguna Beach, CA (US); Dan Hubbard, Carlsbad, CA (US); Nicholas J Verenini, San Diego, CA (US); Ali A. Mesdaq, Escondido, CA (US)

(73) Assignee: Websense, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,597

(22) Filed: Dec. 23, 2013

(65) Prior Publication Data

US 2014/0115699 A1 Apr. 24, 2014

Related U.S. Application Data

(63) Continuation of application No. 11/484,335, filed on Jul. 10, 2006, now Pat. No. 8,615,800.

(51) Int. Cl.
  *H04L 29/06* (2006.01)
  *G06F 17/30* (2006.01)
(52) U.S. Cl.
  CPC ...... *H04L 63/1441* (2013.01); *G06F 17/30864* (2013.01)
(58) Field of Classification Search
  CPC .............................. H04L 63/14; H04L 63/1416
  USPC .......................................................... 726/22
  See application file for complete search history.

(56) References Cited

U.S. PATENT DOCUMENTS

| 4,423,414 | A | 12/1983 | Bryant et al. |
| 4,734,036 | A | 3/1988 | Kasha |

(Continued)

FOREIGN PATENT DOCUMENTS

| EP | 0 658 837 | A2 | 12/1994 |
| EP | 0 748 095 | | 12/1996 |

(Continued)

OTHER PUBLICATIONS

Canali et al., "Prophiler: A Fast Filter for the Large-Scale Detection of Malicious Web Pages", 2011, pp. 197-206.*

(Continued)

*Primary Examiner* — Thanhnga B Truong
*Assistant Examiner* — Thaddeus Plecha
(74) *Attorney, Agent, or Firm* — Knobbe Martens Olson & Bear LLP

(57) ABSTRACT

A system and computer based method are provided for identifying active content in websites on a network. One embodiment includes a computer based method of classifying web content. The method receives content of a web page, and determines a first property associated with the content, the first property including static content. The method executes active content associated with the webpage, and determines a second property associated with the content based at least in part on the executing, the second property including the active content. The method also evaluates a logical expression relating the first property and the second property, and associates the web page with a category based on a result of the evaluation. The evaluation of the logical expression at least in part evaluates whether a constant value matches at least a portion of the content of the web page.

18 Claims, 22 Drawing Sheets

(56) References Cited

U.S. PATENT DOCUMENTS

| | | |
|---|---|---|
| 4,941,084 A | 7/1990 | Terada et al. |
| 5,408,642 A | 4/1995 | Mann |
| 5,493,692 A | 2/1996 | Theimer et al. |
| 5,541,911 A | 7/1996 | Nilakantan et al. |
| 5,548,729 A | 8/1996 | Akiyoshi et al. |
| 5,555,376 A | 9/1996 | Theimer et al. |
| 5,581,703 A | 12/1996 | Baugher et al. |
| 5,586,121 A | 12/1996 | Moura et al. |
| 5,606,668 A | 2/1997 | Shwed |
| 5,648,965 A | 7/1997 | Thadani et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A | 1/1998 | Schloss |
| 5,712,979 A | 1/1998 | Graber et al. |
| 5,720,033 A | 2/1998 | Deo |
| 5,724,576 A | 3/1998 | Letourneau |
| 5,742,759 A | 4/1998 | Nessett et al. |
| 5,758,257 A | 5/1998 | Herz et al. |
| 5,768,519 A | 6/1998 | Swift et al. |
| 5,774,668 A | 6/1998 | Choquier |
| 5,781,801 A | 7/1998 | Flanagan et al. |
| 5,787,253 A | 7/1998 | McCreery et al. |
| 5,787,427 A | 7/1998 | Benantar et al. |
| 5,796,944 A | 8/1998 | Hill et al. |
| 5,799,002 A | 8/1998 | Krishnan |
| 5,801,747 A | 9/1998 | Bedard |
| 5,826,014 A | 10/1998 | Coley et al. |
| 5,828,833 A | 10/1998 | Belville et al. |
| 5,828,835 A | 10/1998 | Isfeld et al. |
| 5,832,212 A | 11/1998 | Cragun et al. |
| 5,832,228 A | 11/1998 | Holden et al. |
| 5,832,503 A | 11/1998 | Malik et al. |
| 5,835,722 A | 11/1998 | Bradshaw et al. |
| 5,835,726 A | 11/1998 | Shwed et al. |
| 5,842,040 A | 11/1998 | Hughes et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,864,683 A | 1/1999 | Boebert et al. |
| 5,884,033 A | 3/1999 | Duvall et al. |
| 5,884,325 A | 3/1999 | Bauer et al. |
| 5,889,958 A | 3/1999 | Willens |
| 5,892,905 A | 4/1999 | Brandt et al. |
| 5,893,086 A | 4/1999 | Schmuck et al. |
| 5,896,502 A | 4/1999 | Shieh et al. |
| 5,898,830 A | 4/1999 | Wesinger et al. |
| 5,899,995 A | 5/1999 | Millier et al. |
| 5,911,043 A | 6/1999 | Duffy et al. |
| 5,920,859 A | 7/1999 | Li |
| 5,933,827 A | 8/1999 | Cole et al. |
| 5,937,404 A | 8/1999 | Csaszar et al. |
| 5,941,947 A | 8/1999 | Brown et al. |
| 5,944,794 A | 8/1999 | Okamoto et al. |
| 5,950,195 A | 9/1999 | Stockwell et al. |
| 5,956,734 A | 9/1999 | Schmuck et al. |
| 5,958,015 A | 9/1999 | Dascalu |
| 5,961,591 A | 10/1999 | Jones et al. |
| 5,963,941 A | 10/1999 | Hirakawa |
| 5,968,176 A | 10/1999 | Nessett et al. |
| 5,974,549 A | 10/1999 | Golan |
| 5,978,807 A | 11/1999 | Mano et al. |
| 5,983,270 A | 11/1999 | Abraham et al. |
| 5,987,457 A | 11/1999 | Ballard |
| 5,987,606 A | 11/1999 | Cirasole et al. |
| 5,987,611 A | 11/1999 | Freund |
| 5,991,807 A | 11/1999 | Schmidt et al. |
| 5,996,011 A | 11/1999 | Humes |
| 5,999,929 A | 12/1999 | Goodman |
| 6,052,723 A | 4/2000 | Ginn |
| 6,052,730 A | 4/2000 | Felciano et al. |
| 6,055,564 A | 4/2000 | Phaal |
| 6,065,056 A | 5/2000 | Bradshaw et al. |
| 6,065,059 A | 5/2000 | Shieh et al. |
| 6,070,242 A | 5/2000 | Wong et al. |
| 6,073,135 A | 6/2000 | Broder et al. |
| 6,073,239 A | 6/2000 | Dotan |
| 6,078,913 A | 6/2000 | Aoki et al. |
| 6,078,914 A | 6/2000 | Redfern |
| 6,085,241 A | 7/2000 | Otis |
| 6,092,194 A | 7/2000 | Touboul |
| 6,105,027 A | 8/2000 | Schneider et al. |
| 6,154,741 A | 11/2000 | Feldman |
| 6,173,364 B1 | 1/2001 | Zenchelsky et al. |
| 6,175,830 B1 | 1/2001 | Maynard |
| 6,178,419 B1 | 1/2001 | Legh-Smith et al. |
| 6,178,505 B1 | 1/2001 | Schneider et al. |
| 6,182,118 B1 | 1/2001 | Finney et al. |
| 6,219,667 B1 | 4/2001 | Lu et al. |
| 6,233,618 B1 | 5/2001 | Shannon |
| 6,233,686 B1 | 5/2001 | Zenchelsky et al. |
| 6,246,977 B1 | 6/2001 | Messerly et al. |
| 6,253,188 B1 | 6/2001 | Witek et al. |
| 6,256,739 B1 | 7/2001 | Skopp et al. |
| 6,266,664 B1 | 7/2001 | Russell-Falla et al. |
| 6,266,668 B1 | 7/2001 | Vanderveldt et al. |
| 6,286,001 B1 | 9/2001 | Walker et al. |
| 6,295,529 B1 | 9/2001 | Corston-Oliver et al. |
| 6,295,559 B1 | 9/2001 | Emens et al. |
| 6,338,088 B1 | 1/2002 | Waters et al. |
| 6,356,864 B1 | 3/2002 | Foltz et al. |
| 6,357,010 B1 | 3/2002 | Viets et al. |
| 6,377,577 B1 | 4/2002 | Bechtolsheim et al. |
| 6,389,472 B1 | 5/2002 | Hughes et al. |
| 6,418,433 B1 | 7/2002 | Chakrabarti et al. |
| 6,434,662 B1 | 8/2002 | Greene et al. |
| 6,446,061 B1 | 9/2002 | Doerre et al. |
| 6,446,119 B1 | 9/2002 | Olah et al. |
| 6,456,306 B1 | 9/2002 | Chin et al. |
| 6,460,141 B1 | 10/2002 | Olden |
| 6,466,940 B1 | 10/2002 | Mills |
| 6,486,892 B1 | 11/2002 | Stern |
| 6,493,744 B1 | 12/2002 | Emens et al. |
| 6,505,201 B1 | 1/2003 | Haitsuka et al. |
| 6,516,337 B1 | 2/2003 | Tripp et al. |
| 6,519,571 B1 | 2/2003 | Guheen et al. |
| 6,539,430 B1 | 3/2003 | Humes |
| 6,564,327 B1 | 5/2003 | Klensin et al. |
| 6,567,800 B1 | 5/2003 | Barrera et al. |
| 6,571,249 B1 | 5/2003 | Garrecht et al. |
| 6,574,660 B1 | 6/2003 | Pashupathy et al. |
| 6,606,659 B1 | 8/2003 | Hegli et al. |
| 6,654,735 B1 | 11/2003 | Eichstaedt et al. |
| 6,654,787 B1 | 11/2003 | Aronson et al. |
| 6,675,169 B1 | 1/2004 | Bennett et al. |
| 6,741,997 B1 | 5/2004 | Liu et al. |
| 6,742,003 B2 | 5/2004 | Heckerman et al. |
| 6,745,367 B1 | 6/2004 | Bates et al. |
| 6,769,009 B1 | 7/2004 | Reisman |
| 6,772,214 B1 | 8/2004 | McClain et al. |
| 6,785,732 B1 * | 8/2004 | Bates et al. ............ 709/232 |
| 6,804,780 B1 | 10/2004 | Touboul |
| 6,807,558 B1 | 10/2004 | Hassett et al. |
| 6,832,230 B1 | 12/2004 | Zilliacus et al. |
| 6,832,256 B1 | 12/2004 | Toga |
| 6,839,680 B1 | 1/2005 | Liu et al. |
| 6,862,713 B1 | 3/2005 | Kraft et al. |
| 6,894,991 B2 | 5/2005 | Ayyagari et al. |
| 6,907,425 B1 | 6/2005 | Barrera et al. |
| 6,944,772 B2 | 9/2005 | Dozortsev |
| 6,947,935 B1 | 9/2005 | Horvitz et al. |
| 6,947,985 B2 | 9/2005 | Hegli et al. |
| 6,978,292 B1 | 12/2005 | Murakami et al. |
| 6,981,281 B1 | 12/2005 | LaMacchia et al. |
| 6,984,991 B2 | 1/2006 | Bond et al. |
| 7,003,442 B1 | 2/2006 | Tsuda |
| 7,058,822 B2 | 6/2006 | Edery et al. |
| 7,065,483 B2 | 6/2006 | Decary et al. |
| 7,089,246 B1 | 8/2006 | O'Laughlen |
| 7,093,293 B1 | 8/2006 | Smithson et al. |
| 7,096,493 B1 | 8/2006 | Liu |

(56) References Cited

U.S. PATENT DOCUMENTS

| | | |
|---|---|---|
| 7,185,015 B2 | 2/2007 | Kester et al. |
| 7,185,361 B1 | 2/2007 | Ashoff et al. |
| 7,194,464 B2 | 3/2007 | Kester et al. |
| 7,194,554 B1 | 3/2007 | Short et al. |
| 7,197,713 B2 | 3/2007 | Stern |
| 7,203,706 B2 | 4/2007 | Jain et al. |
| 7,209,893 B2 | 4/2007 | Nii |
| 7,213,069 B2 | 5/2007 | Anderson et al. |
| 7,219,299 B2 | 5/2007 | Fields et al. |
| 7,260,583 B2 | 8/2007 | Wiener et al. |
| 7,313,823 B2 | 12/2007 | Gao |
| 7,359,372 B2 | 4/2008 | Pelletier et al. |
| 7,370,365 B2 | 5/2008 | Carroll et al. |
| 7,373,385 B2 | 5/2008 | Prakash |
| 7,376,154 B2 | 5/2008 | Ilnicki et al. |
| 7,487,217 B2 | 2/2009 | Buckingham et al. |
| 7,487,540 B2 | 2/2009 | Shipp |
| 7,533,148 B2 | 5/2009 | McMillan et al. |
| 7,548,922 B2 | 6/2009 | Altaf et al. |
| 7,562,304 B2 | 7/2009 | Dixon et al. |
| 7,568,002 B1 | 7/2009 | Vacanti et al. |
| 7,587,488 B2 | 9/2009 | Ahlander et al. |
| 7,590,716 B2 | 9/2009 | Sinclair et al. |
| 7,603,685 B2 | 10/2009 | Knudson et al. |
| 7,603,687 B2 | 10/2009 | Pietraszak et al. |
| 7,610,342 B1 | 10/2009 | Pettigrew et al. |
| 7,627,670 B2 | 12/2009 | Haverkos |
| 7,647,383 B1 | 1/2010 | Boswell et al. |
| 7,660,861 B2 | 2/2010 | Taylor |
| 7,664,819 B2 | 2/2010 | Murphy et al. |
| RE41,168 E | 3/2010 | Shannon |
| 7,690,013 B1 | 3/2010 | Eldering et al. |
| 7,693,945 B1 | 4/2010 | Dulitz et al. |
| 7,739,338 B2 | 6/2010 | Taylor |
| 7,739,494 B1 | 6/2010 | McCorkendale et al. |
| 7,797,443 B1 | 9/2010 | Pettigrew et al. |
| 7,870,203 B2 | 1/2011 | Judge et al. |
| 7,895,445 B1 | 2/2011 | Albanese et al. |
| 7,899,866 B1 | 3/2011 | Buckingham et al. |
| 7,904,958 B2 | 3/2011 | Lee |
| 7,941,490 B1 | 5/2011 | Cowings |
| 7,966,658 B2 | 6/2011 | Singh et al. |
| 8,533,349 B2 | 9/2013 | Hegli et al. |
| 8,615,800 B2 * | 12/2013 | Baddour et al. .......... 726/22 |
| 2001/0032205 A1 | 10/2001 | Kubaitis |
| 2001/0032258 A1 | 10/2001 | Ishida et al. |
| 2001/0039582 A1 | 11/2001 | McKinnon et al. |
| 2001/0047343 A1 | 11/2001 | Dahan et al. |
| 2002/0042821 A1 | 4/2002 | Muret et al. |
| 2002/0049883 A1 | 4/2002 | Schneider et al. |
| 2002/0059221 A1 | 5/2002 | Whitehead et al. |
| 2002/0062359 A1 | 5/2002 | Klopp et al. |
| 2002/0073089 A1 | 6/2002 | Schwartz et al. |
| 2002/0091947 A1 | 7/2002 | Nakamura |
| 2002/0095415 A1 | 7/2002 | Walker et al. |
| 2002/0110084 A1 | 8/2002 | Butt et al. |
| 2002/0129039 A1 | 9/2002 | Majewski et al. |
| 2002/0129140 A1 | 9/2002 | Peled et al. |
| 2002/0129277 A1 | 9/2002 | Caccavale |
| 2002/0133509 A1 | 9/2002 | Johnston et al. |
| 2002/0144129 A1 | 10/2002 | Malivanchuk et al. |
| 2002/0152284 A1 | 10/2002 | Cambray et al. |
| 2002/0174358 A1 | 11/2002 | Wolff et al. |
| 2002/0178374 A1 | 11/2002 | Swimmer et al. |
| 2002/0199095 A1 | 12/2002 | Bandini et al. |
| 2003/0005112 A1 | 1/2003 | Krautkremer |
| 2003/0009495 A1 | 1/2003 | Adjaoute |
| 2003/0023860 A1 | 1/2003 | Eatough et al. |
| 2003/0028564 A1 | 2/2003 | Sanfilippo |
| 2003/0051027 A1 | 3/2003 | Aupperle et al. |
| 2003/0074567 A1 | 4/2003 | Charbonneau |
| 2003/0097617 A1 | 5/2003 | Goeller et al. |
| 2003/0105863 A1 | 6/2003 | Hegli et al. |
| 2003/0110168 A1 | 6/2003 | Kester et al. |
| 2003/0110272 A1 | 6/2003 | Du Castel et al. |
| 2003/0120543 A1 | 6/2003 | Carey |
| 2003/0126136 A1 | 7/2003 | Omoigui |
| 2003/0126139 A1 | 7/2003 | Lee et al. |
| 2003/0135611 A1 | 7/2003 | Kemp et al. |
| 2003/0149692 A1 | 8/2003 | Mitchell |
| 2003/0158923 A1 | 8/2003 | Burkhart |
| 2003/0177187 A1 | 9/2003 | Levine et al. |
| 2003/0177394 A1 | 9/2003 | Dozortsev |
| 2003/0182420 A1 | 9/2003 | Jones et al. |
| 2003/0182421 A1 | 9/2003 | Faybishenko et al. |
| 2003/0185399 A1 | 10/2003 | Ishiguro |
| 2003/0229849 A1 | 12/2003 | Wendt |
| 2004/0003139 A1 | 1/2004 | Cottrille et al. |
| 2004/0006621 A1 | 1/2004 | Bellinson et al. |
| 2004/0006706 A1 | 1/2004 | Erlingsson |
| 2004/0015586 A1 | 1/2004 | Hegli et al. |
| 2004/0019656 A1 | 1/2004 | Smith |
| 2004/0034794 A1 | 2/2004 | Mayer et al. |
| 2004/0049514 A1 | 3/2004 | Burkov |
| 2004/0054521 A1 | 3/2004 | Liu |
| 2004/0062106 A1 | 4/2004 | Ramesh et al. |
| 2004/0068479 A1 | 4/2004 | Wolfson et al. |
| 2004/0078591 A1 | 4/2004 | Teixeira et al. |
| 2004/0088570 A1 | 5/2004 | Roberts et al. |
| 2004/0111499 A1 | 6/2004 | Dobrowski et al. |
| 2004/0123157 A1 | 6/2004 | Alagna et al. |
| 2004/0128285 A1 | 7/2004 | Green et al. |
| 2004/0139160 A1 | 7/2004 | Wallace et al. |
| 2004/0139165 A1 | 7/2004 | McMillan et al. |
| 2004/0148524 A1 | 7/2004 | Airamo |
| 2004/0153305 A1 | 8/2004 | Enescu et al. |
| 2004/0153644 A1 | 8/2004 | McCorkendale et al. |
| 2004/0167931 A1 | 8/2004 | Han |
| 2004/0172389 A1 | 9/2004 | Galai et al. |
| 2004/0181788 A1 | 9/2004 | Kester et al. |
| 2004/0220924 A1 | 11/2004 | Wootton |
| 2005/0015626 A1 | 1/2005 | Chasin |
| 2005/0033967 A1 | 2/2005 | Morino et al. |
| 2005/0044156 A1 | 2/2005 | Kaminski et al. |
| 2005/0050222 A1 | 3/2005 | Packer |
| 2005/0060140 A1 | 3/2005 | Maddox et al. |
| 2005/0066197 A1 | 3/2005 | Hirata et al. |
| 2005/0080855 A1 | 4/2005 | Murray |
| 2005/0080856 A1 | 4/2005 | Kirsch |
| 2005/0091535 A1 | 4/2005 | Kavalam et al. |
| 2005/0131868 A1 * | 6/2005 | Lin et al. .......... 707/3 |
| 2005/0132042 A1 | 6/2005 | Cryer |
| 2005/0132184 A1 | 6/2005 | Palliyil et al. |
| 2005/0155012 A1 | 7/2005 | Tayama et al. |
| 2005/0188036 A1 | 8/2005 | Yasuda |
| 2005/0210035 A1 | 9/2005 | Kester et al. |
| 2005/0223001 A1 | 10/2005 | Kester et al. |
| 2005/0251862 A1 | 11/2005 | Talvitie |
| 2005/0256955 A1 | 11/2005 | Bodwell et al. |
| 2005/0257261 A1 | 11/2005 | Shraim et al. |
| 2005/0283836 A1 * | 12/2005 | Lalonde et al. .......... 726/24 |
| 2005/0283837 A1 | 12/2005 | Olivier et al. |
| 2006/0004636 A1 | 1/2006 | Kester et al. |
| 2006/0004717 A1 | 1/2006 | Ramarathnam et al. |
| 2006/0010217 A1 | 1/2006 | Sood |
| 2006/0026105 A1 | 2/2006 | Endoh |
| 2006/0031213 A1 | 2/2006 | Wilson et al. |
| 2006/0031311 A1 | 2/2006 | Whitney et al. |
| 2006/0031359 A1 | 2/2006 | Clegg et al. |
| 2006/0031504 A1 | 2/2006 | Hegli et al. |
| 2006/0036874 A1 | 2/2006 | Cockerille et al. |
| 2006/0053488 A1 | 3/2006 | Sinclair et al. |
| 2006/0059238 A1 | 3/2006 | Slater et al. |
| 2006/0064469 A1 | 3/2006 | Balasubrahmaniyan et al. |
| 2006/0068755 A1 | 3/2006 | Shraim et al. |
| 2006/0069697 A1 | 3/2006 | Shraim et al. |
| 2006/0075072 A1 | 4/2006 | Sinclair et al. |
| 2006/0075494 A1 * | 4/2006 | Bertman et al. .......... 726/22 |
| 2006/0075500 A1 | 4/2006 | Bertman et al. |
| 2006/0080735 A1 | 4/2006 | Brinson et al. |
| 2006/0095404 A1 | 5/2006 | Adelman et al. |
| 2006/0095459 A1 | 5/2006 | Adelman et al. |
| 2006/0095586 A1 | 5/2006 | Adelman et al. |
| 2006/0095965 A1 | 5/2006 | Phillips et al. |

(56) References Cited

U.S. PATENT DOCUMENTS

| | | |
|---|---|---|
| 2006/0101514 A1 | 5/2006 | Milener et al. |
| 2006/0122957 A1 | 6/2006 | Chen |
| 2006/0129644 A1 | 6/2006 | Owen et al. |
| 2006/0161986 A1 | 7/2006 | Singh et al. |
| 2006/0168006 A1 | 7/2006 | Shannon et al. |
| 2006/0168022 A1 | 7/2006 | Levin et al. |
| 2006/0191008 A1 | 8/2006 | Fernando et al. |
| 2006/0206713 A1 | 9/2006 | Hickman et al. |
| 2006/0239254 A1 | 10/2006 | Short et al. |
| 2006/0259948 A1* | 11/2006 | Calow et al. ............. 726/1 |
| 2006/0265750 A1 | 11/2006 | Huddleston |
| 2006/0277280 A1 | 12/2006 | Craggs |
| 2006/0288076 A1 | 12/2006 | Cowings et al. |
| 2007/0005762 A1 | 1/2007 | Knox et al. |
| 2007/0011739 A1 | 1/2007 | Zamir et al. |
| 2007/0028302 A1 | 2/2007 | Brennan et al. |
| 2007/0078936 A1 | 4/2007 | Quinlan et al. |
| 2007/0083929 A1 | 4/2007 | Sprosts et al. |
| 2007/0124388 A1 | 5/2007 | Thomas |
| 2007/0130351 A1 | 6/2007 | Alperovitch et al. |
| 2007/0156833 A1 | 7/2007 | Nikolov et al. |
| 2007/0195779 A1 | 8/2007 | Judge et al. |
| 2007/0204223 A1 | 8/2007 | Bartels et al. |
| 2007/0260602 A1 | 11/2007 | Taylor |
| 2007/0282952 A1 | 12/2007 | Lund et al. |
| 2007/0299915 A1 | 12/2007 | Shraim et al. |
| 2008/0016339 A1 | 1/2008 | Shukla |
| 2008/0077995 A1 | 3/2008 | Curnyn |
| 2008/0082662 A1 | 4/2008 | Dandliker et al. |
| 2008/0184366 A1 | 7/2008 | Alperovitch et al. |
| 2008/0267144 A1 | 10/2008 | Jano et al. |
| 2008/0295177 A1 | 11/2008 | Dettinger et al. |
| 2009/0070872 A1 | 3/2009 | Cowings et al. |
| 2009/0138573 A1 | 5/2009 | Campbell et al. |
| 2010/0005165 A1 | 1/2010 | Sinclair et al. |
| 2010/0017487 A1 | 1/2010 | Patinkin |
| 2010/0154063 A1* | 6/2010 | Hutton et al. ............ 726/24 |
| 2010/0205265 A1 | 8/2010 | Milliken et al. |
| 2011/0099620 A1* | 4/2011 | Stavrou et al. ............ 726/12 |
| 2011/0314546 A1 | 12/2011 | Aziz et al. |
| 2012/0159620 A1 | 6/2012 | Seifert et al. |

FOREIGN PATENT DOCUMENTS

| | | |
|---|---|---|
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 484 893 | 12/2004 |
| EP | 1 494 409 | 1/2005 |
| EP | 1 510 945 | 3/2005 |
| EP | 1 638 016 | 3/2006 |
| EP | 1 643 701 | 4/2006 |
| GB | 2418330 | 3/2006 |
| GB | 2418999 | 4/2006 |
| JP | 10 243018 | 9/1998 |
| JP | 11-219363 | 8/1999 |
| JP | 2000-235540 A | 8/2000 |
| JP | 2002-358253 | 12/2002 |
| JP | 2003-050758 | 2/2003 |
| JP | 2004-013258 | 1/2004 |
| WO | WO 92/19054 | 10/1992 |
| WO | WO/9605549 A1 | 2/1996 |
| WO | WO 96/42041 | 12/1996 |
| WO | WO 98/28690 | 7/1998 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 0155873 A1 * | 8/2001 |
| WO | WO 2005/010692 | 2/2005 |
| WO | WO 2005/017708 | 2/2005 |
| WO | WO 2005/022319 | 3/2005 |
| WO | WO 2005/074213 | 8/2005 |
| WO | WO 2005/119488 | 12/2005 |
| WO | WO 2006/027590 | 3/2006 |
| WO | WO 2006/030227 A1 | 3/2006 |
| WO | WO 2006/062546 | 6/2006 |
| WO | WO 2006/136605 | 12/2006 |
| WO | WO 2007/059428 A | 5/2007 |
| WO | WO 2008/008339 | 1/2008 |

OTHER PUBLICATIONS

Moshchuk et al., "SpyProxy: Execution-based Detection of Malicious Web Content", 2007, pp. 27-42.*
Ma et al., "Beyond Blacklisting: Learning to Detect Malicious Web Sites from Suspicious URLs", Jun. 2009, pp. 1245-1253.
Supplementary European Search Report for EPO App. No. 00 90 7078, mailed May 18, 2004.
European Search Report for Application No. 02258462.7, mailed Jan. 30, 2006.
Sandhu, et al., Access Control: Principles and Practice, IEEE Communications Magazine, pp. 40-48, Sep. 1994.
C.L.Schuba and E.H. Spafford. Countering abuse of name-based authentication. In 22.sup.nd Annual Telecommunications Policy Research Conference, 21 pp., 1996.
Surfcontrol plc, SuperScout Web Filter Reviewer's Guide, 36pp., 2002.
Yialelis, et al., Role-Based Security for Distributed Object Systems, Proceedings of the IEEE Fifty Workshops on Enabling Technology: Infrastructure for Collaborative Enterprises (WET ICE '96), 6pp., Jun. 19-21, 1996.
Roberts-Witt, S., The 1999 Utility Guide: Corporate Filtering, PC Magazine Online, Apr. 5, 1999, pp. 1-11.
Sequel Technology, Inc., Sequel and Surfwatch Partner to Provide Innovative Internet Resource Management Tools for Large Enterprises, Internet, Online!, Feb. 25, 1999, pp. 1-3.
SurfWatch Software, SurfWatch.RTM. Professional Edition: Product Overview, Internet, Online!, May 26, 1999, p. 1.
Newman, H., A Look at Some Popular Filtering Systems, Internet, Online!, Jul. 25, 1999, pp. 1-11.
Secure Computing Corporation, SmartFilter.TM. WebTool, Dec. 1, 1998, pp. 1-2.
Molitor, Andrew. "An Architecture for Advanced Packet Filtering", Jun. 1995 Proceedings of the Fifth USENIX UNIX Security Symposium, pp. 1-11.
Microsoft Press Computer Dictionary, 3.sup.rd ed., Microsoft Press, pp. 262, 276, 1997.
Wobus, J., DHCP FAQ, www.nd.edu/.about.milind/FAQs/FAQ.sub.--dhcp, pp. 1-10, Dec. 29, 1995.
Gittler, F., et al., The DCE Security Service, Hewlett-Packard Journal, pp. 41-48, Dec. 1995.
Snyder, J., A Flurry of Firewalls, Network World, www.opus1.com/www/jms/nw-firewall.html, pp. 1-8, Jan. 29, 1996.
C. L. Schuba and E. H. Spafford, Countering abuse of name-based authentication, Pub: in 22nd Annual Telecommunications Policy Research Conference, 1996, pp. 21.
Cohen, F., A Cryptographic Checksum for Integrity Protection, Computers & Security, Elsevier Science Publishers, Dec. 1, 1987, vol. 6, Issue 6, pp. 505-510, Amsterdam, NL.
European Search Report for Application No. 02258462.7, Jan. 30, 2006.
Forte, M. et al., "A content classification and filtering server for the Internet", Applied Computing 2006. 21st Annual ACM Symposium on Applied Computing, [online] http://portal.acnn.org/citation.cfm?id=1141553&coll=portal&dl=ACM&CFID=21-81828&CFTOKEN=6882 7537> [retrieved on Dec. 7, 2007], Apr. 23-27, 2006, pp. 1166-1171.
Gittler F., et al., The DCE Security Service, Pub: Hewlett-Packard Journal, Dec. 1995, pp. 41-48.
IBM Corp., Enforced Separation of Roles in a Multi-User Operating System, IBM Technical Disclosure Bulletin, Dec. 1991, Issue 34, pp. 120-122.
IBM Technical Disclosure Bulletin, Mean to Protect System from Virus, IBM Corp., Aug. 1, 1994, Issue 659-660.

(56) References Cited

OTHER PUBLICATIONS

Igakura, Tomohiro et al., Specific quality measurement and control of the service-oriented networking application., Technical Report of IEICE, IEICE Association, Jan. 18, 2002, vol. 101, Issue 563, pp. 51-56, Japan.
International Search Report and Written Opinion dated Jun. 30, 2008 for PCT Patent Application No. PCT/US2007/024557.
International Search Report and Written Opinion for PCT Application No. PCT/US2007/015730 dated Dec. 27, 2008, 16 pages.
International Search Report, International Application No. PCT/US2006/049149, Mailed Mar. 10, 2008, 4 pages.
Microsoft Press Computer Dictionary, 3rd edition, Pub: Microsoft Press, 1997, pp. 262, 276.
Molitor, Andrew, An Architecture for Advanced Packet Filtering, Proceedings for the Fifth Usenix Unix Security Symposium, Jun. 1995, pp. 1-11.
Newman, H., A Look at Some Popular Filtering Systems, Pub: Internet, Online!, Jul. 25, 1999, pp. 1-11.
PCT International Search Report and Written Opinion for corresponding International Application No. PCT/GB2005/002961, Oct. 19, 2005.
Reid, Open Systems Security: Traps and Pitfalls, Computer & Security, 1995, Issue 14, pp. 496-517.
Roberts-Witt, S., The 1999 Utility Guide: Corporate Filtering, Pub: PC Magazine Online, Apr. 5, 1999, pp. 1-11.
Sandhu, et al., Access Control: Principles and Practice, IEEE Communications Magazine, Sep. 1994, pp. 40-48.
Secure Computing Corporation, SmartFilter.TM. Web Tool, Dec. 1, 1998, pp. 1-2.
Sequel Technology, Inc., Sequel and Surfwatch Partner to Provide Innovative Internet Resource Management Tools for Large Enterprises, Pub: Internet, Online!, Feb. 25, 1999, pp. 1-3.
Snyder, J., A Flurry of Firewalls, www.opus1.com/www/jms/nw-firewall.html, Network World, Jan. 29, 1996, pp. 1-8.
Stein, Web Security—a step by step reference guide, Addison-Wesley, 1997, pp. 387-415.
Supplementary European Search Report for EPO App. No. 00 90 7078, May 18, 2004.
SurfControl PLC, SuperScout Web Filter Reviewer's Guide, 2002, pp. 36.
Surfcontrol, Project Nomad, http:www.surfcontrol.com/news/newsitem.aspx?id=593, Oct. 29, 2003.
SurfWatch Software, SurfWatch.RTM. Professional Edition: Product Overview, Pub: Internet, Online!, May 26, 1999, pp. 1.
Symantec Corporation, E-security begins with sound security policies, Announcement Symantec, XP002265695, Jun. 14, 2001, pp. 1,9.
Williams, R., Data Integrity with Veracity, Retrieved from the Internet: <URL: ftp://ftp.rocksoft.com/clients/rocksoft/papers/vercty10.ps>, Sep. 12, 1994.
Wobus, J., DHCP FAQ, www.nd.edu/.about.milind/FAQs/FAQ.sub.--dhcp, Dec. 29, 1995, pp. 1-10.
Yialelis, et al., Role-Based Security for Distributed Object Systems, Proceedings of the IEEE Fifty Workshops on Enabling Technology: Infrastructure for Collaborative Enterprises, WET ICE '96, Jun. 19-21, 1996, pp. 6.

Hubbard, Dan, Websense Security Labs, The Web Vector: Exploiting Human and Browser Vulnerabilities, Toorcon 2005 (http://www.toorcon.org).
"Bloom Filter" on Wikipedia, http://en.wikipedia.org/wiki/Bloom.sub.--filter, retrieved on Jul. 31, 2009.
"Trends in Badware 2007", StopBadware.org.
Abiteboul, et al., The Lorel query language for semistructured data, Int'l Journal on Digital Libraries, Apr. 1, 1997, vol. 1, Issue 1, pp. 68-88.
Chawathe, et al., Representing and querying changes in a semistructured data, Proceedings from 14th Int'l Conference, Feb. 23-27, 1998, pp. 4-13.
Deal et al., Prescription for data security, NIKKEI BITE, NIKKEI BP Inc., Oct. 1, 1991, vol. 91, pp. 351-369, Japan.
Dell Zhang, et al., A data model and algebra for the web, Proceedings 10th Int'l Workshop on Florence, Italy, Sep. 1-3, 1999, pp. 711-714.
Goldman, R., et al., DataGuides: Enabling Query Formulation and Optimization in Semistructured Databases, Proceedings of the International Conference on Very Large Data Bases, Aug. 26, 1997, pp. 436-445.
Greenfield, P., et al., Access Prevention Techniques for Internet Content Filtering, CSIRO (XP002265027), Dec. 1999.
International Search Report for PCT/US2010/035992, Aug. 11, 2010.
IronPort Web Reputation White Paper, A Comprehensive, Proactive Approach to Web-Based Threats, Ironport Systems 2009, pp. 10.
IronPort Web Reputation: Protect and Defend Against URL-Based Threats; Ironport Systems, Apr. 2006, 8 pages.
Nestorov, et al., Representative objects: concise representations of semistructured, hierarchical Data, Proceedings, 13th Int'l Conference in Birmingham, UK, Apr. 7-11, 1997, pp. 79-90.
Ohuchi, Access control for protecting an important data from destruction and manipulation, NIKKEI Computer, NIKKEI Magurouhiru Inc., Feb. 3, 1986, vol. 141, pp. 75-80, Japan.
Resnick, P. et al., "PICS: Internet Access Controls Without Censorship", Communications of the Association for Comuting Machinery, ACM, Oct. 1, 1996, vol. 39, Issue 10, pp. 87-93, New York, NY.
Takizawa, Utility of a filtering tool 'Gate Guard' of Internet, Nikkei Communication, Nikkei BP Inc., Oct. 20, 1997, vol. 256, pp. 136-139, Japan.
United Kingdom Search Report for Application No. GB0417620.2 and Combined Search and Examination Report, UKIPO, Oct. 8, 2004.
United Kingdom Search Report for corresponding UK Application No. GB0420023.4, Jan. 31, 2005.
United Kingdom Search Report for corresponding UK Application No. GB0420024.2, Nov. 4, 2004.
United Kingdom Search Report for corresponding UK Application No. GB0420025.9, Jan. 6, 2005.
Kang et al., Two Phase Approach for Spam-Mail Filtering, Computational and Information Science, First International Symposium, 2004, vol. 3314, pp. 800-805.
Lee et al., Neural Networks for Web Content Filtering, IEEE, Sep. 2002, pp. 48-57.

\* cited by examiner

Logging Database

| No. Requests | URL | JavaScript? | ActiveX? |
|---|---|---|---|
| 9000 | www.gougle.com | Yes | Yes |
| 32 | www.amazon.com/specialoftheday | No | Yes |
| 2 | www.sportsweb.com | Yes | No |
| 1 | www.aasdfghd.com | No | No |

*FIG. 4*

URL Access Policy Database

| User | Category | Always block? | Allowed Times |
|---|---|---|---|
| asmith | Malicious | Yes | |
| bnguyen | Gambling | | 6pm – 8 am |
| clee | Spyware | Yes | |
| | Politics | | 6pm – 8 am |

*FIG. 5*

Categorized URLs — 146

| URL | Category |
|---|---|
| http://example1.com/abc | Malicious |
| http://example2.biz/abc | Gambling |
| http://example4.com/abc | Spyware |

Uncategorized URLs — 147

| URL |
|---|
| http://example4.com/abc |
| http://example6.biz/abc |
| http://example1.com/abc |

FIG. 6B

URL DATA COLLECTED BY COLLECTION SYSTEM

| IP ADDRESS | URL | PAGE_CONTENT | ACTIVE CONTENT? |
|---|---|---|---|
| 134.34.54.158 | www.gougle.com | BLOB | Yes |
| 152.68.94.129 | www.amazon.com/specialoftheday | BLOB | Yes |
| 10.42.228.233 | www.sportsweb.com | BLOB | No |
| 152.36.242.21 | www.aasdfghd.com | TEXT | No |
| 134.34.54.158 | www.gougle.com/page2.html | BLOB | Yes |

*FIG. 11*

Properties Database

| Property_id | Property | Type |
|---|---|---|
| 1 | <javascript> | Keyword |
| 2 | <object> | Keyword |
| 3 | data=.*\.txt | Regular Expression |
| 4 | Content-Type | HTTP data |

FIG. 13A

Processed Web Page Properties Database

| url_id | url |
|---|---|
| 1 | http://www.a.com |
| 2 | http://www.b.com |
| 3 | http://www.c.com |
| 4 | http://www.d.com |

| url_id | Property_id |
|---|---|
| 1 | 1 |
| 1 | 2 |
| 2 | 3 |
| 2 | 4 |
| 3 | 1 |

FIG. 13B

Definitions Database

| Expression | Category |
|---|---|
| Content-Type = HTML and "<javascript>" > 2 | Malicious |
| <object> = 6 and URL matches "a.com" | Gambling |
| "data=.*\.txt" = "data=xyx333.txt" | Spyware |

FIG. 13C

SYSTEM AND METHOD FOR ANALYZING WEB CONTENT

CROSS REFERENCE TO RELATED APPLICATIONS

This application is a continuation of U.S. patent application Ser. No. 11/484,335, filed Jul. 10, 2006, now U.S. Pat. No. 8,615,800, and is also related to U.S. patent application Ser. No. 11/484,240, filed on Jul. 10, 2006, now U.S. Pat. No. 8,020,206. The disclosures of both of these applications are hereby incorporated by reference in their entirety.

BACKGROUND OF THE INVENTION

1. Field of the Invention

This application relates to data and application security. In particular, this application discloses systems methods of collecting and mining data to determine whether the data is associated with malicious content.

2. Description of the Related Technology

Traditionally, computer viruses and other malicious content were most often provided to client computers by insertion of an infected diskette or some other physical media into the computer. As the use of e-mail and the Internet increased, e-mail attachments became a prevalent method for distributing virus code to computers. To infect the computer with these types of viruses having malicious content, some affirmative action was typically required by the user such as opening an infected file attachment or downloading an infected file from a web site and launching it on their computer. Over time, antivirus software makers developed increasingly effective programs designed to scan files and disinfect them before they had the opportunity to infect client computers. Thus, computer hackers were forced to create more clever and innovative ways to infect computers with their malicious code.

In today's increasingly-networked digital world, distributed applications are being developed to provide more and more functionality to users in an open, collaborative networking environment. While these applications are more powerful and sophisticated, their increased functionality requires that network servers interact with client computers in a more integrated manner. For example, where previous web applications primarily served HTML content to client browsers and received data back from the client via HTTP post commands, many new web applications are configured to send various forms of targeted content, such as active content, to the client computer which cause applications to be launched within the enhanced features of newer web browsers. For example, many web-based applications now utilize Active-X controls which must be downloaded to the client computer so they may be effectively utilized. Java applets, JavaScript, and VBScript commands also have the capability of modifying client computer files in certain instances.

The convenience that has arrived with these increases in functionality has not come without cost. Newer web applications and content are significantly more powerful than previous application environments. As a result, they also provide opportunities for malicious code to be downloaded to client computers. In addition, as the complexity of the operating system and web browsing applications increase, it becomes more difficult to identify security vulnerabilities which may allow hackers to transfer malicious code to client computers. Although browser and operating system vendors generally issue software updates to remedy these vulnerabilities, many users have not configured their computers to download these updates. Thus, hackers have begun to write malicious code and applications which utilize these vulnerabilities to download themselves to users' machines without relying on any particular activity of the user such as launching an infected file. One example of such an attack is the use of malicious code embedded into an active content object on a website. If the malicious code has been configured to exploit a vulnerability in the web browser, a user may be infected or harmed by the malicious code as a result of a mere visit to that page, as the targeted content in the page will be executed on the user's computer.

An attempt to address the problem of malicious code being embedded in active content is to utilize heightened security settings on the web browser. However, in many corporate environments, intranet or extranet applications are configured to send executable content to client computers. Setting browser settings to a high security level tends to impede or obstruct the effective use of these types of "safe" applications. Another attempt to address the issue is to block all executable content using a network firewall application. This brute force approach also is ineffective in many environments, because selective access to certain types of content is necessary for software to correctly function.

What is needed is a system and method that allows for the detection of malicious web content without compromising user functionality. Further, what is needed is a system that can detect targeted content such as active content and quickly identify and categorize its behavior, and provide protection from the malicious content to a high volume of client computers with minimum delay.

SUMMARY OF CERTAIN INVENTIVE EMBODIMENTS

The system, method, and devices of the present invention each have several aspects, no single one of which is solely responsible for its desirable attributes. Without limiting the scope of this invention, several of its features will now be discussed briefly.

One embodiment includes a method of classifying web content. The method includes receiving content of at least one web page. The method further includes identifying properties associated with the web page based at least partly on the content of the web page. The method further includes storing the properties in a database of web page properties. The method further includes comparing at least one definition to properties stored in the database of web page properties. The method further includes identifying the web page with at least one definition based on comparing the definition with the stored properties. The method further includes identifying the web page with at least one category associated with the at least one definition, wherein the category is indicative of active content associated with the web page.

On embodiment includes a system for classifying web content. The system includes a database configured to properties associated with web pages. The system further includes at least one processor configured to identify properties associated with a web page based at least partly on content of the web page and store the properties in the database of web page properties. The processor is further configured to compare at least one definition to properties stored in the database of web page properties, identify the web page with at least one definition based on comparing the definition with the stored properties, and identify the web page with at least one category associated with the at least one definition, wherein the category is indicative of active content associated with the web page.

BRIEF DESCRIPTION OF THE DRAWINGS

In this description, reference is made to the drawings wherein like parts are designated with like numerals throughout.

FIG. 4 is an example of a logging database.

FIG. 5 is an example of a URL Access Policy database table.

FIGS. 6A and 6B are examples of categorized and uncategorized URLs, respectively.

FIG. 11 is an example of URL-related data collected by the collection module from FIG. 9.

FIG. 13A is an example of a properties table.

FIG. 13B is an example of a processed web page properties table.

FIG. 13C is an example of a definitions table.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Certain embodiments provide for systems and method of identifying and categorizing web content, including potentially executable web content and malicious content, that is found at locations identified by Uniform Resource Locators (URLs). As used herein, potentially executable web content generally refers to any type of content that includes instructions that are executed by a web browser or web client computer. Potentially executable web content may include, for example, applets, executable code embedded in HTML or other hypertext documents (including script languages such as JavaScript or VBScript), executable code embedded in other documents, such as Microsoft Word macros, or stylesheets. Potentially executable web content may also refer to documents that execute code in another location such as another web page, another computer, or on the web browser computer itself. For example, a HTML web page that includes an "OBJECT" element, and thus can cause execution of ActiveX or other executable components, may generally be considered potentially executable web content regardless of the location of the executable components. Malicious content may refer to content that is not executable but which is calculated to exploit a vulnerability on a client computer. However, potentially executable web content may also be malicious content. For example, image files have been used to exploit vulnerabilities in certain operating systems when those images are processed for display. Moreover, malicious web content may also refer to interactive content such as "phishing" schemes in which a HTML form or other web content is designed to appear to be provided by another, typically trusted, web site such as a bank, in order to deceive the user into providing credentials or other sensitive information to an unauthorized party.

Description of System

Figure 1:
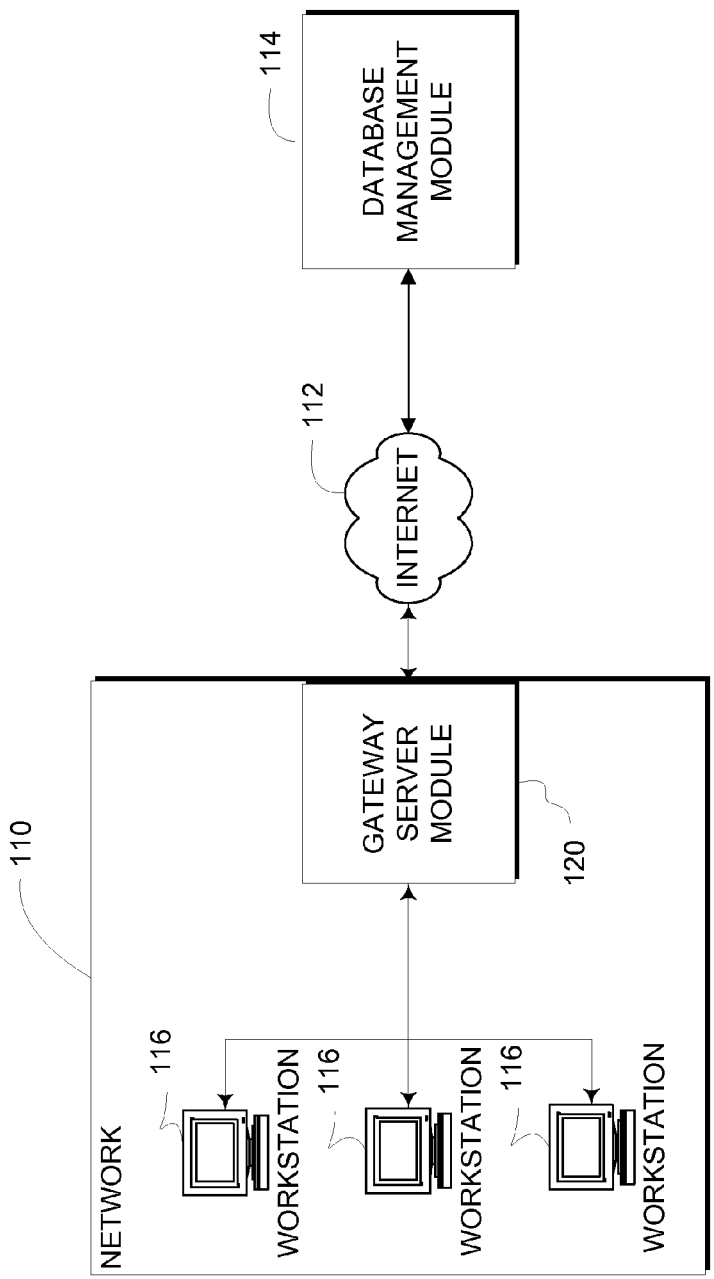
FIG. 1 is a block diagram of various components of a system in accordance with aspects of the invention.

FIG. 1 provides a top level illustration of an exemplary system. The system includes a network 110. The network 110 may be a local area network, a wide area network, or some other type of network. The network 110 may include one or more workstations 116. The workstations 116 may be various types of client computers that are attached to the network. The client computers 116 may be desktop computers, notebook computers, handheld computers or the like. The client computers may also be loaded with operating systems that allow them to utilize the network through various software modules such as web browsers, e-mail programs, or the like.

Each of the workstations 116 may be in electrical communication with a gateway server module 120. The gateway server module may reside at the edge of the network 110 so that traffic sent to and from the Internet 112 may pass through it on its way into or out of the network 110. The gateway server module 112 may take the form of a software module that is installed on a server that stands as a gateway to a wider area network 112 than the network 110 to which the workstations 116 are directly attached. Also connected to the Internet 112 is a database management module 114. The database management module also may be a software module (or one or more hardware appliances) which resides on one or more computing devices. The database management module 114 may reside on a machine that includes some sort of network connecting hardware, such as a network interface card, which allows the database management module 114 to send and receive data and information to and from the Internet 112.

Figure 2:
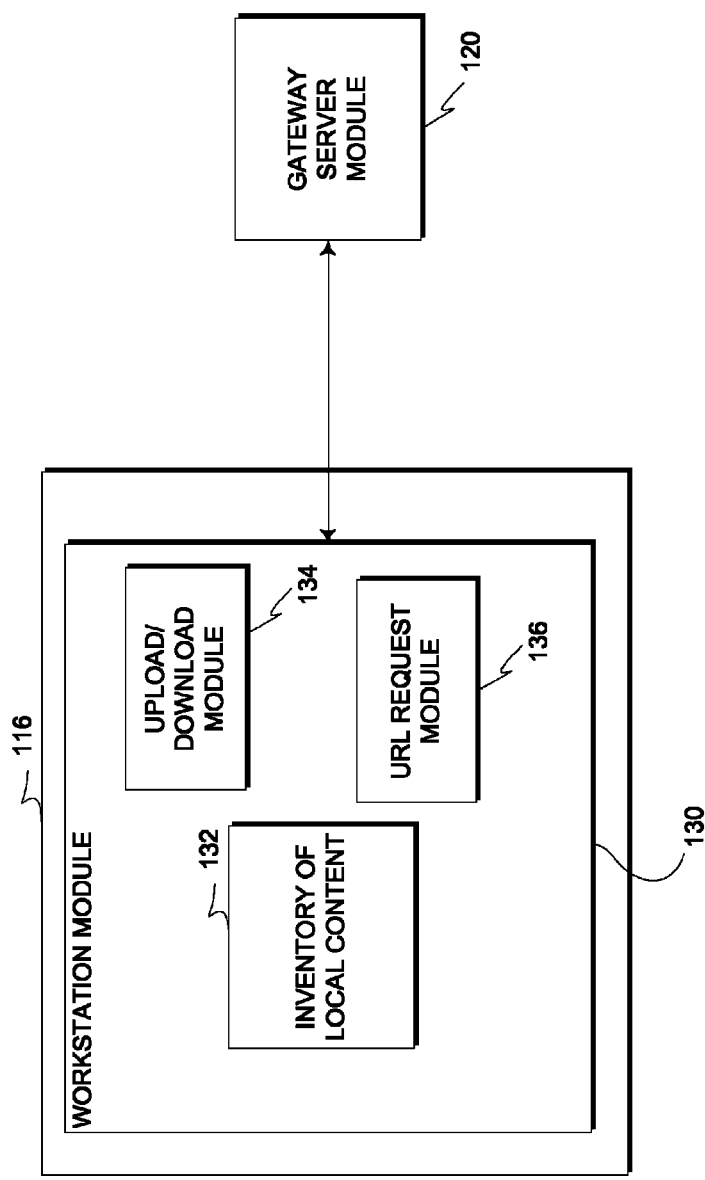
FIG. 2 is a block diagram of a workstation module from FIG. 1.

Referring now to FIG. 2, a more detailed view of the workstation 116 is presented. The workstation 116 may include a workstation module 130. The workstation module 130 may take the form of software installed to run on the operating system of the workstation 116. Alternatively, the workstation module 130 could be an application running on another machine that is launched remotely by the workstation 116.

The workstation module 130 may include various components. The workstation module may include an inventory of a local active content module 132 which records all web content stored on the workstation 116. For example, the local content inventory module 132 may periodically inventory all local content. The inventoried data may be uploaded to the gateway server module 120 for comparison to the categorized URL/content database 146. The local content inventory module 132 may determine whether new content is being introduced to the workstation 116 by comparison to the inventoried local content 132.

The workstation module also may include an upload/download module 134 and a URL request module 136. The upload/download module 134 may be used to send and receive data from the network 110, through the gateway server module 120 and to the Internet 112. The URL request module 136 receives a URL input from either a user or some system process, and may send a request via the gateway server module 120 to retrieve the file and/or content associated with that URL. Typically, the functions of each of the upload/download module 134 and the URL request module 136 may be performed by a software applications such as web browsers, with Internet Explorer®, Mozilla Firefox, Opera, Safari, being examples of browsing software well-known in the art. Alternatively, the functions of the modules may be divided among different software applications. For example, an FTP application may perform the functions of the upload/download module 134, while a web browser my perform URL requests. Other types of software may also perform the functions of the upload/download module 134. Although these types of software are generally not desirable on a workstation, software such as Spyware, or Trojan Horses may make requests to send and receive data from the Internet.

Figure 3:
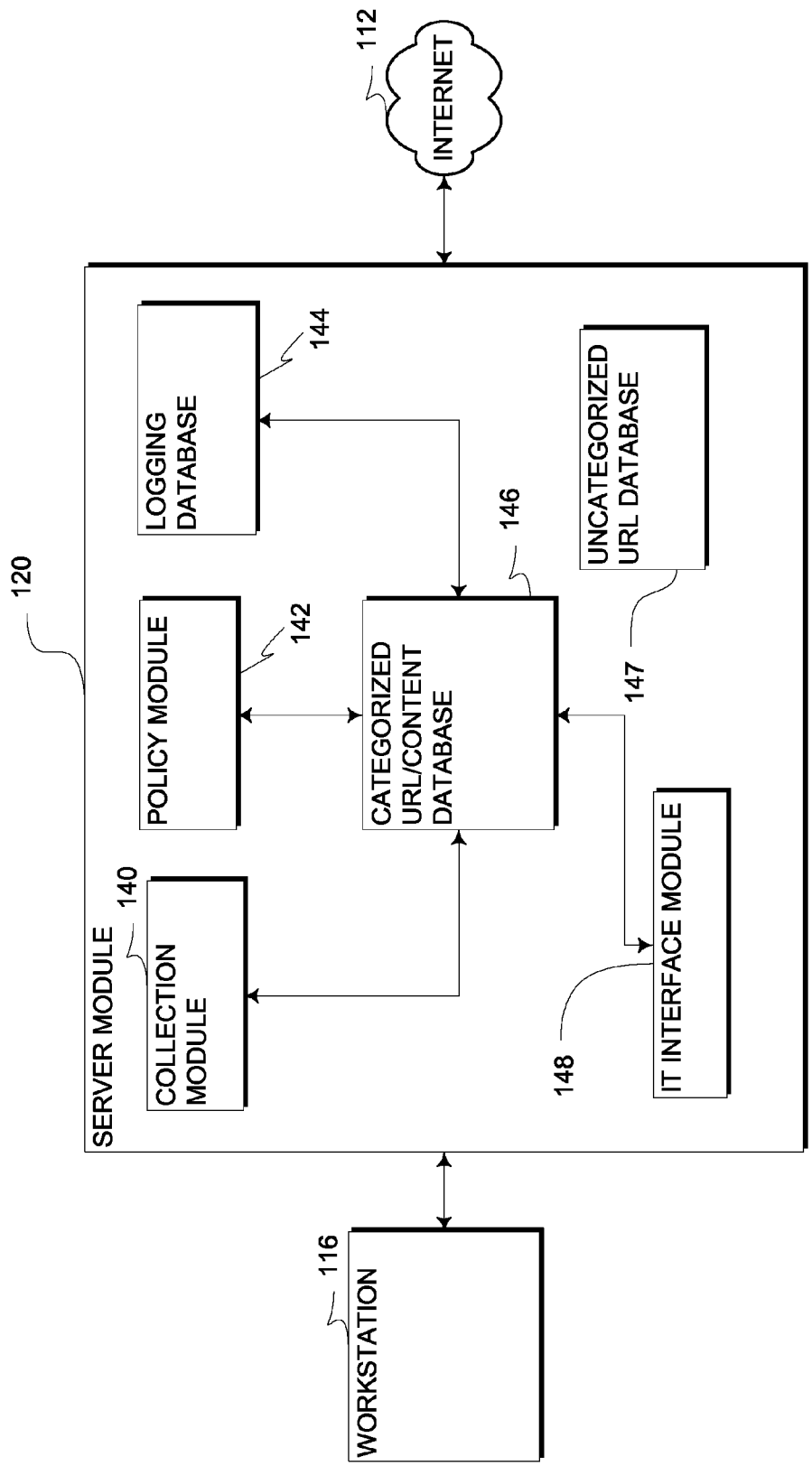
FIG. 3 is a block diagram of a gateway server module from FIG. 1.

The workstation module 130 may be in communication with the gateway server module 120. The gateway server module 120 may be used to analyze incoming and outgoing web traffic and to make various determinations about the impact the traffic may have on the workstations 116. Referring now to FIG. 3, an example of the gateway server module 120 is provided. The gateway server module 120 is in two way communication with the workstation 116. It may receive file uploads and downloads and URL requests from the workstation module 130. The gateway server module 120 is also in two way communication with the Internet 112. Thus, requests originating within the workstations 116 of the network 110 may be required to pass through the gateway server module 120 as they proceed to the Internet. In some embodiments, the gateway server module 120 may be integrated with some firewall hardware or software that protects the network 110 from unauthorized intrusions from the Internet 112. In other embodiments, the gateway server module 120 may be a standalone hardware appliance or even a software module installed on a separate gateway server residing at the network gateway to the Internet 112.

As discussed above, the gateway server module 120 may receive URL requests and upload/download data from the workstation 116 by way of the workstation module 130. The gateway server module 120 may include various components that perform various functions based on the data received.

One feature included in the gateway server module 120 is a categorized URL database 146. The URL database 146 may be used to store information about URLs including data that is associated with the URLs. The categorized URL database 146 may be a relational database, or it may be stored in some other form such as a flat file, an object-oriented database, and may be accessed via an application programming interface (API), or some database management software (DBMS). The URL database 146 may generally be used to help determine whether URL requests sent by the URL request module 136 will be permitted to be completed. In one embodiment, the URLs stored in the URL database 146 are categorized.

The gateway server module 120 may also include a policy module 142. The policy module 142 may used to implement network policies regarding how certain content will be handled by the gateway server module 120 or by a firewall or some other security software installed within the network 110. In one embodiment, the policy module 142 may be configured to provide the system guidance on how to handle URL requests for categorized URLs. For example, the gateway server module 120 may be configured to disallow URL requests that are categorized as being "Malicious" or "Spyware." In other embodiments, the policy module 142 may be used to determine how to handle URL requests that have not been categorized. In one embodiment, the system may be configured to block all requests for URLs that are not in the categorized URL database 146. The policy module 142 may also be configured to allow certain requests of uncategorized URLs based on the user making the request or the time at which the request is made. This allows the system to avoid having a one-size-fits-all configuration when such as configuration would not meet the business needs of the organization running the gateway server module 120.

The gateway server module 120 may include a collection module 140. The collection module 140 may be a software program, routine, or process that is used to collect data about URLs. In one embodiment, when a request for a particular URL is received from the URL request module 136, the collection module 140 may be configured to visit the URL and download the page data to the gateway server module 120 for analysis by components of the gateway server module 120. The downloaded data may also be sent via the Internet 112 for delivery to the database management module 114 (as will be discussed in further detail below).

In some embodiments, the gateway server module 120 may also include a logging database 144. The logging database 144 may perform various functions. For example, it may store records of certain types of occurrences within the network 110. In one embodiment, the logging database 144 may be configured to record each event in which an uncategorized URL is requested by a workstation 116. In some embodiments, the logging database 144 may also be configured to record the frequency with which a particular uncategorized URL is requested. This information may be useful in determining whether an uncategorized URL should be of particular importance or priority and should be categorized by the database management module 114 ahead of earlier received data. In some embodiments, uncategorized URLs may be stored separately in an uncategorized URL database 147.

For example, some spyware may be written to request data from a particular URL. If many workstations 116 within the network 110 are infected with the spyware, repeated requests to a particular URL may provide an indication that some anomaly is present within the network. The logging database may also be configured to record requests of categorized URL data. In some embodiments, categorizing requests of categorized URLs may be helpful in determining whether a particular URL has been mischaracterized.

Referring now to FIG. 4, an example of the logging database 144 is discussed. The logging database 144 includes four columns of data. The first column, "No. Page Requests" 152 is indicative of the number of times a particular URL has been requested by users within the network 110. The second column "URL" 154 records the particular URL string that is being logged in the logging database 144. Thus, when a URL is sent to the logging database 144, the database may first be searched to determine whether the URL string is already in it. If not, then the URL string may be added to the database. In some embodiments, the collection module 140 may be configured to visit the requested URL and gather data about the URL. The collection module 140 may retrieve the page source of the requested URL and scan it for certain keywords that may indicate a type of content. For example, if the page source includes "javascript://" then the page may be identified as having JavaScript. While such content is not inherently dangerous, a web page with JavaScript may have a greater chance of including malicious content designed to exploit how a browser application handles JavaScript function calls. In some embodiments, this data may be stored in the logging database 144 in JavaScript column 155. The logging database may also receive similar information from pages that include Active-X content and store that content within Active X column 156. In other embodiments, other types of active content may be detected and stored for java applets, VBScript, and the like.

Referring again to FIG. 3, the gateway server module 120 may further include an administrative interface module 148 or "admin module." The admin module 148 may be used to allow network administrators or other technical personnel within an organization to configure various features of the gateway server module 120. In certain embodiments, the admin module 148 allows the network administrator or some other network management-type to configure the policy module 142.

Referring now to FIG. 5, an example of a URL access policy database 158 is provided. The URL access policy database 158 may be used by the policy module 142 to implement policies for accessing web-based content by workstations 116 within the network 110. In the embodiment shown the URL access policy database 158 includes a table with four columns. The first column is a user column 160. The "User" column 160 includes data about the users that are subject to the policy defined in a given row of the table. The next column, "Category" 162, lists the category of content to which the policy defined by that row is applicable. The third column, "Always Block" 164 represents the behavior or policy that is implemented by the system when the user and category 166 of requested content match the user and category as defined in that particular row. In one embodiment, the "Always Block" field may be a Boolean-type field in which the data may be set to either true or false. Thus, in the first row shown in the data table, the policy module 142 is configured to "always block" requests for "malicious content" by user "asmith."

As noted above, the policy module may also be configured to implement policies based on different times. In the embodiment provided in FIG. 5, the fourth column "Allowed Times" 166 provides this functionality. The second row of data provides an example of how time policies are implemented. The user 164 is set to "bnguyen" and the category 162 is "gambling." The policy is not configured to "always block" gambling content for "bnguyen," as indicated by the field being left blank. However, the time during which these URL requests are permitted is limited to from 6 PM to 8 AM. Thus, adopting these types of policies allows network administrators to provide a certain degree of flexibility to workstations and users, but to do so in a way that network traffic is not compromised during typical working hours.

FIGS. 6A and 6B provide illustrations of how the categorized URL database 146 may store categorized data. In one embodiment, the categorized URLs may be stored in a two-column database table such as the one shown in FIG. 6A. In one embodiment, the table may include a URL column 172 which may simply store the URL string that has been characterized. The Category column 174 may store data about the how that URL has been characterized by database module 114 (as will be described in detail below). In one embodiment, the URL field may be indexed so that it may be more quickly searched in real time. Because the list of categorized URLs may reached well into the millions of URLs, a fast access routine is beneficial.

Referring now to FIG. 6B, the table of uncategorized URLs 147 is provided (described earlier in connection with FIG. 3). This table may be populated by URL requests from the workstation 116 which request URLs that are not present in the categorized URL table 146. As will be described in greater detail below, the gateway server module 120 may be configured to query the categorized URL database 146 to determine whether a requested URL should be blocked. If the requested URL is in the categorized database 146 the policy module may determine whether to allow the request to proceed to the internet 112. If the requested URL is not found in the categorized URL database, however, it may be added to the list of uncategorized URLs 176 so that it may be sent to the database management module 114 via the Internet 112 and later analyzed and categorized and downloaded into the database of categorized URLs 146.

Figure 7:
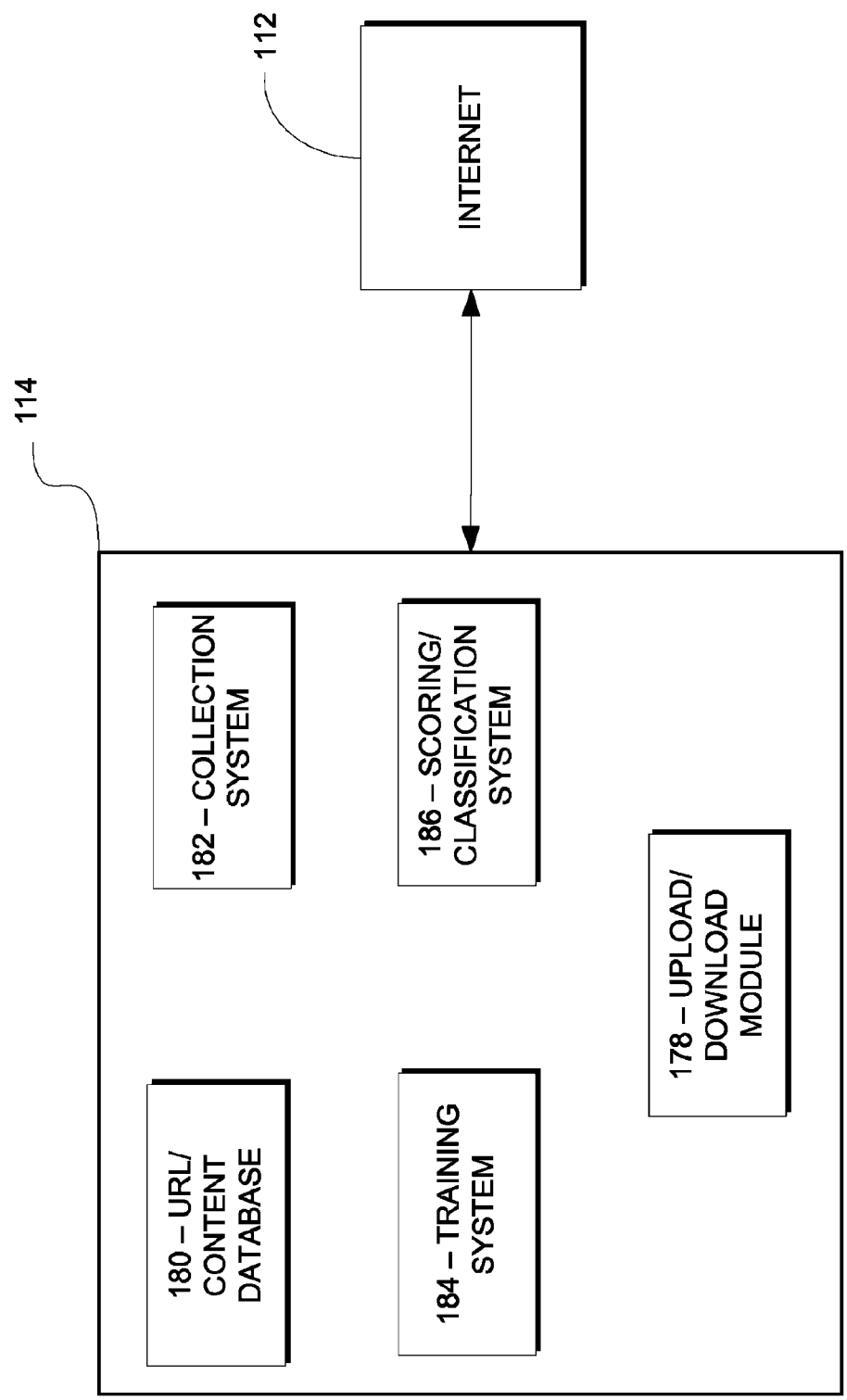
FIG. 7 is a block diagram of a database management module from FIG. 1.

FIG. 7 is an illustration of various components that may be included in the database management module 114. As discussed above, the database management module 114 may be located remotely (accessible via Internet 112) from the network 110 and its associated workstations 116. The database management module may take the form of one or many different hardware and software components such as a server bank that runs hundreds of servers simultaneously to achieve improved performance.

In one embodiment, the database management module 114 may include an upload/download module 178. The upload/download module 178 may be a software or hardware component that allows the database management module 114 to send and receive data from the Internet 112 to any number of locations. In one embodiment, the upload/download module is configured to send newly categorized URLs to gateway server modules 120 on the Internet 112 for addition to their local URL databases 146.

The database management module 114 may also include a URL/content database 180. The URL/content database 180 may take the form of a data warehouse which stores URL strings and information about URLs that have been collected by the collection system 182. The URL/content database 180 may be a relational database that is indexed to provide quick and effective searches for data. In certain embodiments, the URL database may be a data warehousing application which spans numerous physical hardware components and storage media. The URL database may include data such as URL strings, the content associated with those strings, information about how the content was gathered (e.g., by a honey client, by a customer submission, etc.), and possibly the date in which the URL was written into the URL/content database 180.

The database management module 114 may further include a training system 184. The training system 184 may be a software/hardware module which is used to define properties and definitions that may be used to categorize web-based content. The database management module 114 may further provide a scoring/classification system 186 which utilizes the definitions and properties created by the training system 184 to provide a score or classification (e.g., a categorization) to web content so that the categorization may be delivered via the upload/download module 178 to gateway server modules 120.

Figure 8:
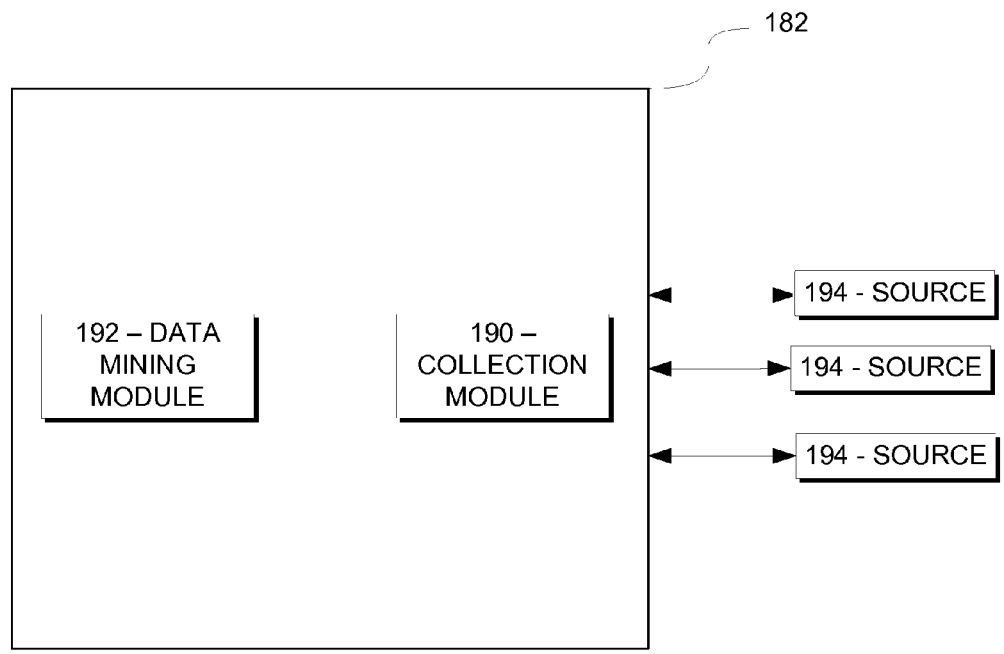
FIG. 8 is a block diagram of a collection system from FIG. 7.

With reference now to FIG. 8, a more detailed view of the collection system 182 is provided. The collection system 182 may include a collection module 190 which is coupled (either directly or indirectly) to a data mining module 192. The collection module 190 may be used by the database management module 114 to collect data for the URL database 180 about URLs that have not been categorized. In addition to URLs, the URL database 180 may also store content associated with URLs. The collection module may also be used to collect URLs for additional analysis by other system components. The collection module 190 may be associated with one or more collection sources 194 from which it may collect data about URLs. Collection sources may take various forms. In some embodiments, the collection sources 194 may include active and passive honeypots and honey clients, data analysis of logging databases 144 stored on gateway server module 120 to identify applications, URLs and protocols for collection. The collection sources may also be webcrawling applications that search the Internet 112 for particular keywords or search phrases within page content. The collection sources 194 may also include URLs and IP addresses data mined from a DNS database to identify domains that are associated with known malicious IP addresses. In some embodiments, URLs for categorization may be collected by receiving malicious code and malicious URL samples from other organizations who share this information. In yet other embodiments, URLs may be collected via e-mail modules configured to receive tips from the public at large, much in the way that criminals are identified through criminal tip hotlines.

Figure 9:
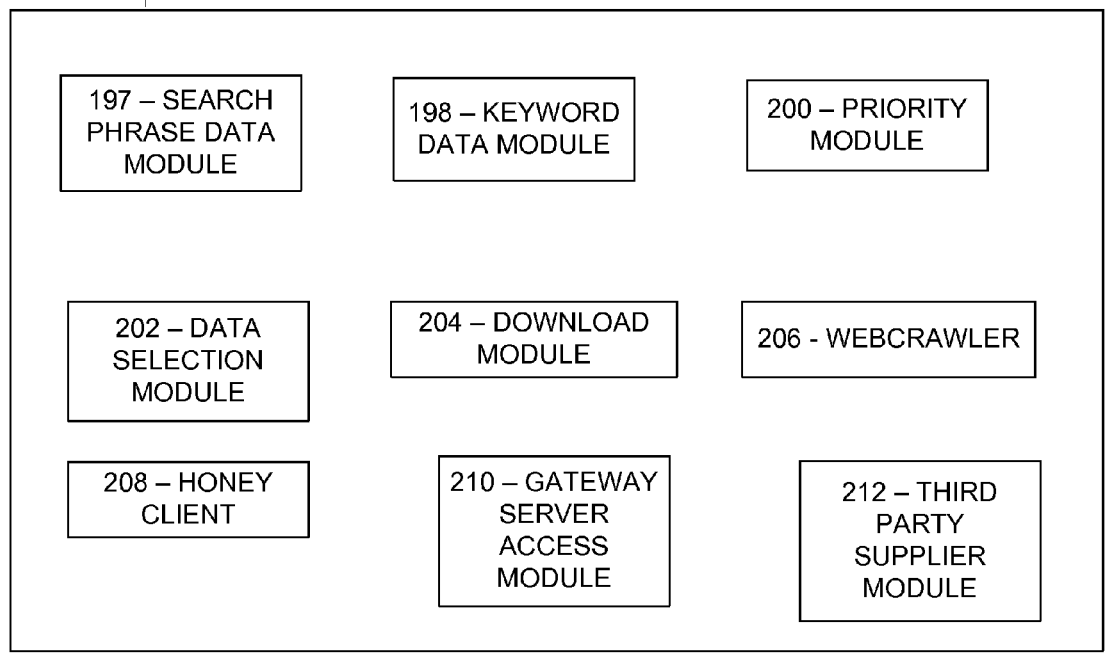
FIG. 9 is a block diagram of a collection module from FIG. 8.

Referring now to FIG. 9, a more detailed view of the collection module 190 is provided. The collection module 190 may include various subcomponents that allow it to effectively utilize each of the collection sources described above. The collection module 190 may include a search phrase data module 197 and a expression data module 198. The search phrase data module 197 collects and provides search phrases that may relevant to identifying inappropriate content. The expression data module may include various types of expressions such as regular expressions, operands, or some other expression. The search phrase data module 197 and the expression data module 198 each may include updatable record sets that may be used to define the search parameters for the web crawling collection source 194. The collection module 190 may also include a priority module 200. The priority module 200 may take the form of a software process running within the collection system 182, or it may run as a separate process. The priority module may be used to prioritize the data collected by the collection module in order to have more potentially dangerous or suspect URLs (or data) receive close inspection prior to the likely harmless URLs. In one embodiment, the priority module 200 may assign priority based on the collection source 194 from which the URL is received. For example, if a URL is received from a customer report, it may be designated with a higher priority. Similarly, if the URL is received from a web crawler accessing a domain or IP address or subnet known to host malicious content in the past, the URL may receive a high priority. Similarly, a potentially dangerous website identified by a honey client (discussed in further detail below) may also receive a high priority. The collection module 190 may also include a data selection module 202 which may work with the priority module 200 to determine whether identified URLs should be tagged as candidate URLs for categorization. In one embodiment, the data selection URL may provide a user interface for receiving search parameters to further refine the prioritized data by searching for data based on priority and content.

As indicated above, the collection module may also include a data download module 204. The data download module 204 may be configured to identify URLs to visit and to download data and content from the visited URLs. The data download module may work in conjunction with various subsystems in the collection module to retrieve data for the URL database 180. One such subsystem is the webcrawler module 206. The webcrawler module 206 may be a software application configured to access websites on the Internet 112 by accessing web pages and following hyperlinks that are included in those pages. The webcrawler module 206 may be configured with several concurrent processes that allow the module to simultaneously crawl many websites and report the visited URLs back to the URL database 180 as will be discussed in further detail below. The collection module 190 may also include a honey client module 208. The honey client module 208 is a software process configured to mimic the behavior of a web browser to visit websites in such a manner that is inviting to malicious code stored within the visited pages. The honey client module 208 may visit the web sites and track the behavior of the websites and download the content back to the URL database 180 for further analysis.

The download module 204 may also include a third party supplier module 212 which is configured to receive URLs and associated content from third parties. For example, the third party module 212 may be configured to provide a website which may be accessed by the general public. The module may be configured to receive an input URL string which may then be entered into the URL database 180. In some embodiments, the third party module may also be configured to receive e-mails from private or public mailing lists, and to identify any URL data embedded within the e-mails for storage in the URL database 180.

The download module may also include a gateway server access module 210. The gateway server access module is a software component or program that may be configured to regularly access the logging database 144 on the gateway server module 120 to download/upload all of the newly uncategorized web content identified by the logging database 144.

Referring back to FIG. 8, the collection system may also include a data mining module 192. The data mining module 192 may be used to obtain additional data about URLs stored in the URL database 180. In many instances, the information supplied by the collection sources 194 to the collection module 190 and URL database 180 is limited to nothing more than a URL string. Thus, in order for the system to effectively categorize the content within that URL, more data may be necessary. For example, the actual page content may need to be examined in order to determine whether there is dangerous content embedded within the URL. The data mining module 192 is used to collect this additional necessary data about the URLs, and will be discussed in further detail below.

Figure 10:
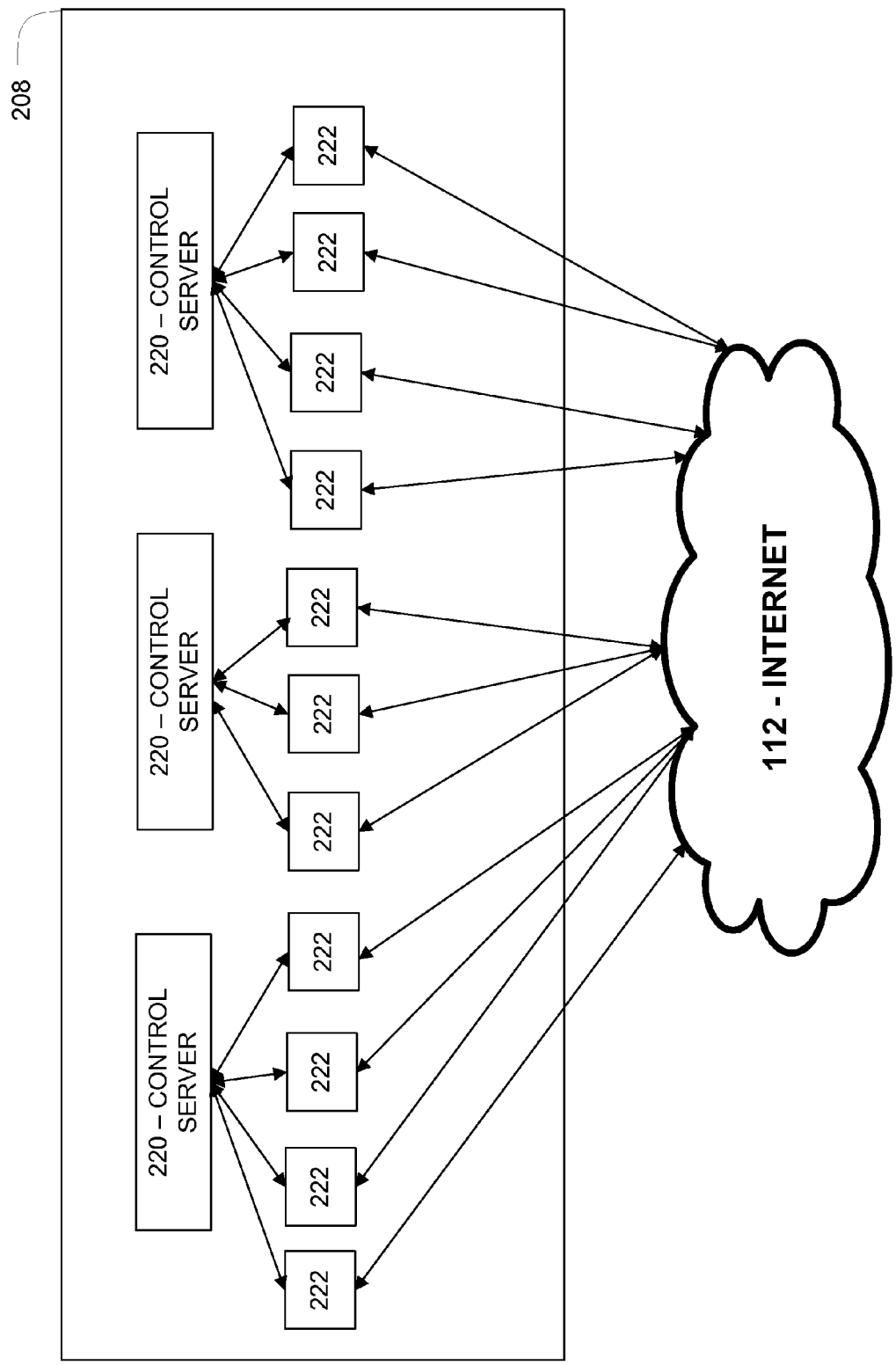
FIG. 10 shows a honey client system according to some aspects of the invention.

FIG. 10 provides a more detailed view of a honey client system 208. The honey client system 208 includes control servers 220. The control servers 220 are used to control a plurality of honey miners 222 which are configured to visit web sites and mimic human browser behavior in an attempt to detect malicious code on the websites. The honey miners 222 may be passive honey miners or active honey miners. A passive honey miner is similar to a web crawler as described above. However, unlike the web crawler above which merely visits the website and reports the URL links available from that site, the passive honey miners may be configured to download the page content and return it to the control servers 220 for insertion into the URL database 180. The honey miners 222 may be software modules on a single machine, or alternately, they may be implemented each on a separate computing device.

In one embodiment, each control server may control 17 passive honey miners 222. The control servers 220 may extract or receive URLs from the URL database 180 which need additional information in order to be fully analyzed or categorized. The control servers 220 provide the URLs to the miners which in turn review the URLs and store the collected data. When a passive miner 222 is finished with a particular URL, it may request another URL from its control server 222. In some embodiments, the miners 222 may be configured to follow links on the URL content so that in addition to visiting URLs specified by the control server 220, the miners may visit content that it linked to those URLs. In some embodiments, the miners 222 may be configured to mine to a specified depth with respect to each original URL. For example, the miners 222 may be configured to mine down through four layers of web content before requesting new URL data from the control server 220.

In other embodiments, the control servers 220 may be configured to control active honey miners 222. In contrast to the passive honey miners which only visit web sites and store the content presented on the sites, the active honey miners 222 may be configured to visit URLs and run or execute the content identified on the sites. In some embodiments, the active honey miners 222 include actual web browsing software that is configured to visit websites and access content on the websites via the browser software. The control server 220 (or the honey miners themselves 222) may be configured to monitor the characteristics of the honey miners 222 as they execute the content on the websites they visit. In one embodiment, the control server 220 will record the URLs that are visited by the honey miners as a result of executing an application or content on the websites visited. Thus, active honey miners 222 may provide a way to more accurately track system behavior and discover previously unidentified exploits. Because the active honey miners expose themselves to the dangers of executable content, in some embodiments, the active honey miners 222 may be located within a sandbox environment, which provides a tightly-controlled set of resources for guest programs to run in, in order to protect the other computers from damage that could be inflicted by malicious content. In some embodiments, the sandbox may take the form of a virtual machine emulating an operating system. In other embodiments, the sandbox may take the form of actual systems that are isolated from the network. Anomalous behavior may be detected by tracking in real-time, changes made to the file system on the sandbox machine. In some embodiments, the code executed by the active honey miners 222 may cause the machine on which they are running to become inoperable due to malicious code embedded in the webpage content. In order to address this issue, the control server may control a replacement miner which may step in to complete the work of a honey miner 222 which is damaged during the mining process.

Referring now to FIG. 11, an example of a set of URL-related data that has been collected by the collection system is provided. Although a particular example of collected data is provided, one of skill in the art will appreciate that other data might be collected in addition to the data provided in this example. Included in the collected data is an IP address 230 for the URL. The IP address 230 may be used to identify websites that are hosting multiple domains of questionable content under the same IP address or on the same server. Thus, if a URL having malicious content is identified as coming from a particular IP address, the rest of the data in the URL/content database 180 may be mined for other URLs having the same IP address in order to select them and more carefully analyze them. The collected URL data may also include a URL 232 as indicated by the second column in FIG. 11. In instances where the data is collected using a mining process such as the honey client process described above, the URL 232 may often include various pages from the same web domains, as the miners may have been configured to crawl through the links in the websites. The collected data may also include the page content 234 for a particular URL. Because the content of a URL may be in the form of graphics, text, applications and/or other content, in some embodiments, the database storing this URL data may be configured to store the page content as a binary large object (blob) or application objects in the data record. However, as some web pages contain text exclusively, the page content 234 may be stored as text as well. In some embodiments, the collection routine may be configured to determine whether the URL contains executable content. In these instances, the resultant data set of collected data may include an indication of whether the URL has executable content 236 within its page code. This information may be later used in selecting data from the URL/content database 180 has candidate data for analysis.

Figure 12:
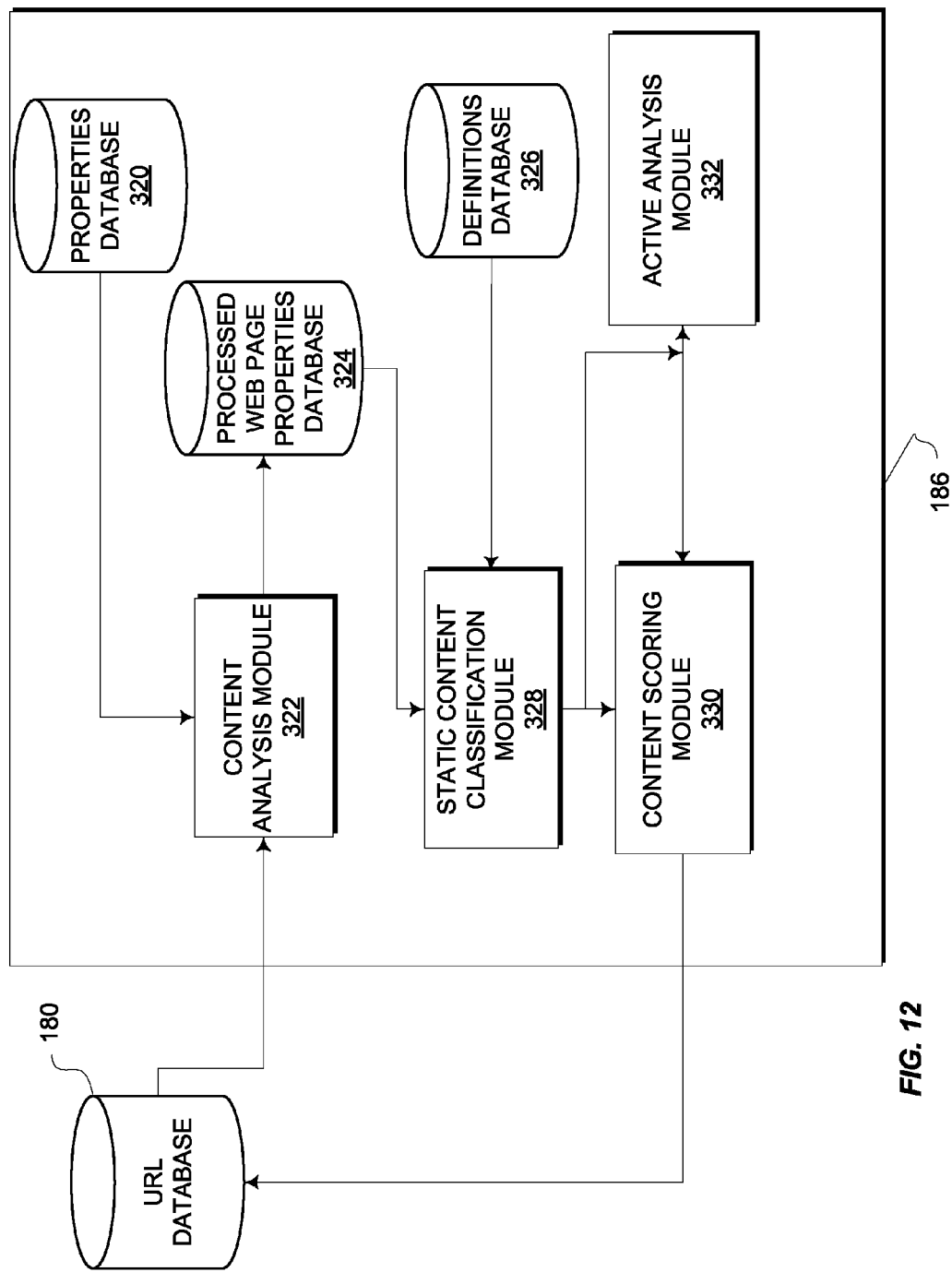
FIG. 12 is a block diagram illustrating a scoring and categorization module from FIG. 7.

FIG. 12 is a block diagram illustrating the scoring and categorization module 186 from FIG. 7. In one embodiment, the scoring and categorization module 168 includes a properties database 320, a, a processed web page properties database 324, a definitions database 326, a static content classification module 328 and a content scoring module 330. In one embodiment, the scoring and categorization module 186 includes an active analysis module 332. The content analysis module 322 receives one or more candidate URLs from the URL database 180 and identifies properties from the properties database 320 that it finds associated with each candidate URL. The values and/or counts of the properties for each URL are stored in the processed web page properties database 324. The static content classification module 328 queries the processed web page properties database 324 based on definitions from the definitions database 326 to associate categories with the candidate URLs. The content scoring module 330 may further associate a score with each URL that can be used to further categorize or to change the categories identified by the static content classification module 328. In one embodiment, the content scoring module 330 may identify candidate URLs for processing by the active analysis module 332. The active analysis module 332 downloads and executes any active content to identify behavior properties associated with the URL. These properties may then be provided to the content scoring module to further categorize the candidate URLs, e.g., change their categories, or add additional categories.

For example, a URL that is processed by the content analysis module 322 may receive a "malicious" category. The content scoring module 330 may then associate a score, e.g., a low score, with the URL that is indicative of the URL not being malicious. To resolve, the content scoring module 330 may provide the URL as a candidate URL to the active analysis module 332 to identify further properties or a behavior score that can be used by the content scoring module 330 to determine whether the "malicious" category is appropriate.

The properties database 320 includes keywords, regular expressions, and other web page properties that can be used to categorize web pages. Properties may also be values associated with the web page such as HTTP request header data or other meta data associated with the web page. For example, properties may includes keywords to be identified in the document such as "<javascript>," "<object>," regular expressions such as "data=.*\.txt" (e.g., the keyword "data=" followed by an arbitrary length string followed by ".txt"), or the content-type of the data from the HTTP header. FIG. 13A is an example of a properties database that includes the property and an additional field identifying the type of property, e.g., a keyword or a regular expression. In the illustrative database, a property ID field is used to provide a unique (within the database) identifier for each property. In other embodiments, other suitable types of keywords may be used.

In one embodiment, the content analysis module 322 receives candidate URLs from the URL database that have been identified by the collection system 182. The content analysis module receives the content and other data associated (such as the HTTP header) with the URLs and identifies one or more of the properties in the properties database 320 that are associated with the candidate web pages and stores data relating to those properties in the processed web page properties database 324. The content analysis module 322 may receive the content of the candidate web pages from the URL database or it may download the data itself. In one embodiment, the honey client module 208 obtains and stores the content of each candidate web page in the URL database. In another embodiment, the content analysis module 322 downloads the content of the candidate web pages as part of processing the web page for properties.

In general, the properties database 320 stores the properties and sufficient information to identify the properties associated with a web page. For example, for keyword or regular expression properties, the properties database 320 may store the keyword or regular expression. In contrast, the processed web page properties database 324 may store counts of the keyword or regular expression found to be associated with each web page by the content analysis module 322. For regular expressions, depending on the embodiment, either a count of matching expressions or the matching expressions themselves, or both may be stored in the processed web page properties database 324. For example, for a particular web page, the processed web page properties database 324 might store the value 3 referring to the number of times that the property "<javascript>" appears in the page, 0 for the number of times the property "<object>" appears, and "data=http://www.example.url/example.txt." for the regular expression property "data=. *\.txt."

FIG. 13B illustrates one embodiment of table in the processed web page properties database 324 in which the example properties of FIG. 13A have been processed with respect to several web pages. In the illustrated embodiment, the database includes two tables, one relating URLs to unique (within the database) identifiers and a second relating the URL identifiers with properties associated with that URL. In the illustrated embodiment, the table includes an entry or row for each property of the web content data associated with the URL. In one embodiment, the database also includes numeric values for each property/URL corresponding to the keyword properties indicate the number of times that the particular property was found in the web page. The database, for example in the URL/property table, may also include the actual expression matching a regular expression property for the URL. In one embodiment, the keyword properties can be searched in the page body and in the header or other metadata. In one embodiment, only the page body is searched. In yet another embodiment, the property may be associated with data, e.g., in the properties database 320, that indicates what data to process in identifying the property in a web page.

In one embodiment, the static content classification module 328 accesses web page properties database 324 and compares the properties for one or more web pages with definitions from the definitions database 326. When a web page matches a particular definition, the web page is identified with one or more categories associated with the definition. In one embodiment, these categories are stored in the URL database in association with the URL. In one embodiment, each definition is expressed in terms of one or more properties of the web page. In one embodiment, definitions are expressed as first order logical operations relating one or more of the properties. In one embodiment, terms of the definition are comprised of comparisons between web page properties or between properties and values (including constant values). For example, a definition might include an expression such as "property_1"="property 2" AND occurrences of property_3>5. In addition to comparisons, terms may include other operations on web page properties such as mathematical, string, or any other suitable computational expression. For example, a simple definition can be "data=,*\.txt"="data=xyx333.txt", which matches any web page have as part of its content the string "data=xyx333.txt" (which matches the regular expression property "data=,*\.txt"). More complex definitions may comprise logical operations on the terms. Such logical operations may include AND, OR, NOT, XOR, IF-THEN-ELSE, or regular expression matches on the properties. In one embodiment, the definitions may also include or correspond to database query expressions such as standard SQL database comparison functions and logical operations. In one embodiment, definitions may include executable code such as scripts or references to executable programs or scripts that at least partially determine a classification for a URL. FIG. 13C illustrates an exemplary portion of a definitions database 326 according to one embodiment. As used herein, categories can refer to any type of classification. For example, a category may be merely a classification that indicates that further processing or analysis be performed for the URL to identify a category for the URL.

In one embodiment, the content scoring module 330 further analyzes web pages and assigns a score to the web page associated with one or more categories. In one embodiment, the score may be based on a weighted combination of the number of times that keywords are found in the web page. In one embodiment, the weights are stored in the properties database in association with the corresponding property.

In another embodiment, the scores may be determined based on information about the URL of the web page. For example, scores may be assigned to particular based on a database of internet addresses and/or domainnames. The database may assign scores to entire subnetworks (e.g., all addresses matching 128.2.*.* may have a particular score). Such networks or subnetworks help identify a web site as being based in a particular country or with a particular service provider. This has been found to be useful in scoring because certain countries and service providers have been correlated with certain types of web content due to different laws or lax enforcement of laws. The scoring system of networks or subnetworks may be based on the relative number of URLs in particular networks or domains that have a particular category. For example, if 95% of the URLs for a particular network in the URL database 180 are classified as malicious, new URLs may be given a high score. In one embodiment, URLs with scores above a threshold are identified with a category, e.g., malicious, regardless of, or in addition to, the category identified by content analysis of the web page. In one embodiment, multiple scores associated with different categories are assigned to each URL, and the categories corresponding to each score above a given threshold are identified with the URL. In one embodiment, multiple threshold are employed. For example, URLs having scores above one threshold value automatically are classified based on the score. In one embodiment, URLs having scores that are below the first threshold but above a second threshold are communicated to a human analyst for classification. In one embodiment, the content scoring module 330 communicates such URLs to the active analysis module 332 for additional analysis.

One embodiment may include a scoring and categorization system such that illustrated in U.S. Pat. No. 6,606,659, entitled "System and method for controlling access to internet sites," which document is incorporated by reference in its entirety.

In one embodiment, the active analysis module 332 executes active content of a web page to identify its behavior properties. These properties may then be used to score and classify the web page. In one embodiment, one or more of the static content classification module 328 and the content scoring module 330 identifies URLs for processing by the active analysis module 332. After receiving candidate URLs, the active analysis module 332 may provide a behavioral score or data associated with one or more behavior properties (e.g., a property such as "writes to registry") to the content scoring module for further categorization.

Figure 14:
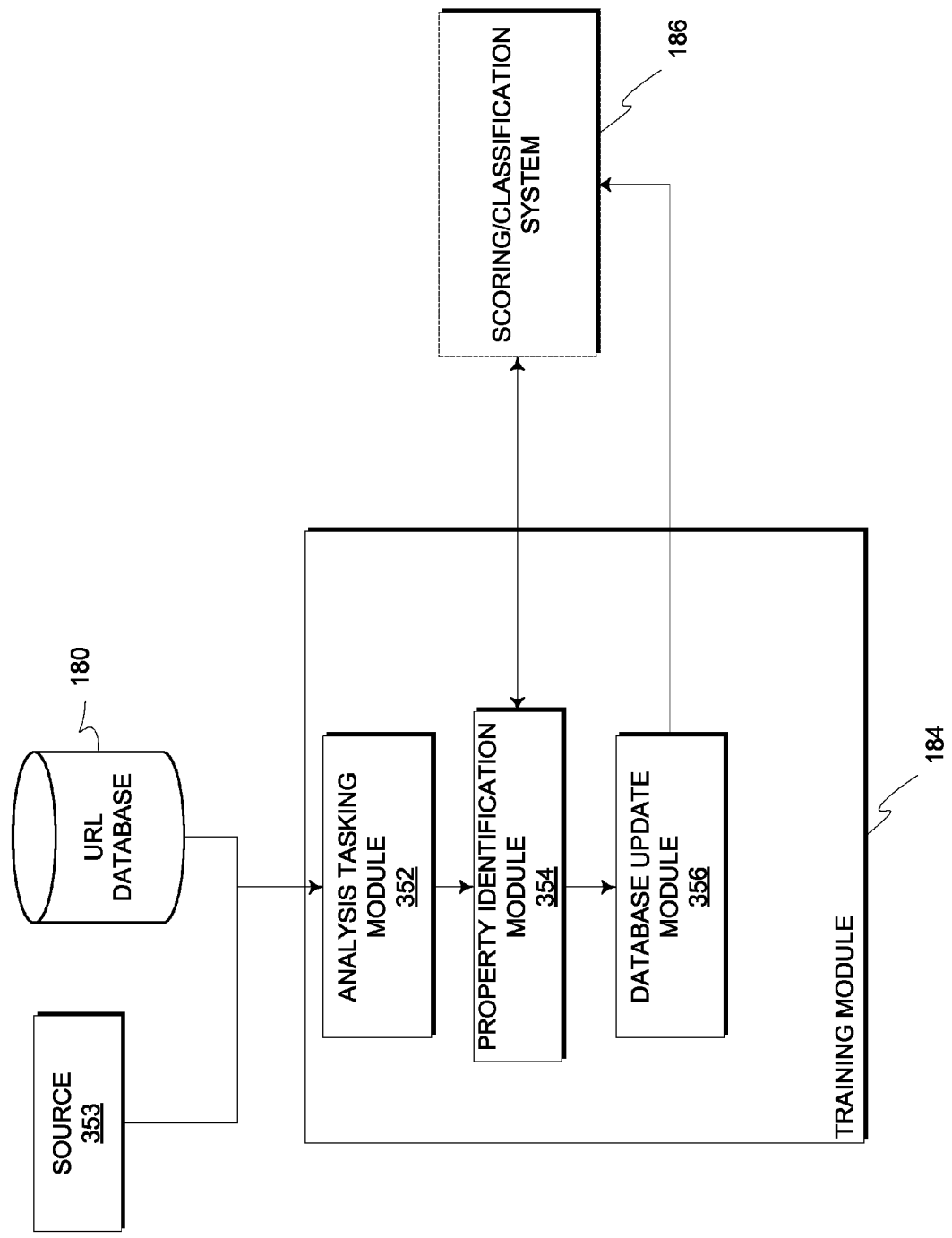
FIG. 14 is a block diagram illustrating one embodiment of a training module from FIG. 7.

FIG. 14 is a block diagram illustrating one embodiment of the training module 184 from FIG. 7. In one embodiment, the training module includes an analysis tasking module 352 that identifies web pages or URLs having content, such as active content, for which additional categories are desired. In one embodiment, the collection module 190 identifies URLs having active content. In another embodiment, an external source, such as security researchers, identify particular URLs having active content that has been identified with one or more categories, e.g., keyloggers, viruses, malicious content, worms, etc. In one embodiment, these may be stored in the URL database 180. In one embodiment, the tasking module 352 maintains a database of such URLs (not shown). In one embodiment, the tasking module 352 database maintains a priority for these URLs and presents them to an analyst based on the priority.

A property identification module 354 identifies properties of the web page and definitions based on those properties that categorize the web page. In one embodiment, the properties identification module 354 provides an interface for a human analyst to apply particular rules or definitions to a URL using the scoring and classification module 186. In addition, in one embodiment, the property identification module 354 may provide an interface for the analyst to identify the URL as a candidate for the active analysis module 332 of FIG. 10 to perform behavioral analysis of the URL to receive additional data for classifying the URL back from the active analysis module 332. The property identification module 354 may then provide this data to the analyst. In one embodiment, the analyst analyzes URL data from the scoring and classification module 186, including the active analysis module 332, to help identify properties and definitions that properly classify the URL and, where possible, other URLs that refer to similarly classified content. In one embodiment, property identification module 354 provides these newly identified properties and definitions to a database update module 356 that stores the new definitions and properties to the properties database 320 and the definitions database 326.

Figure 15:
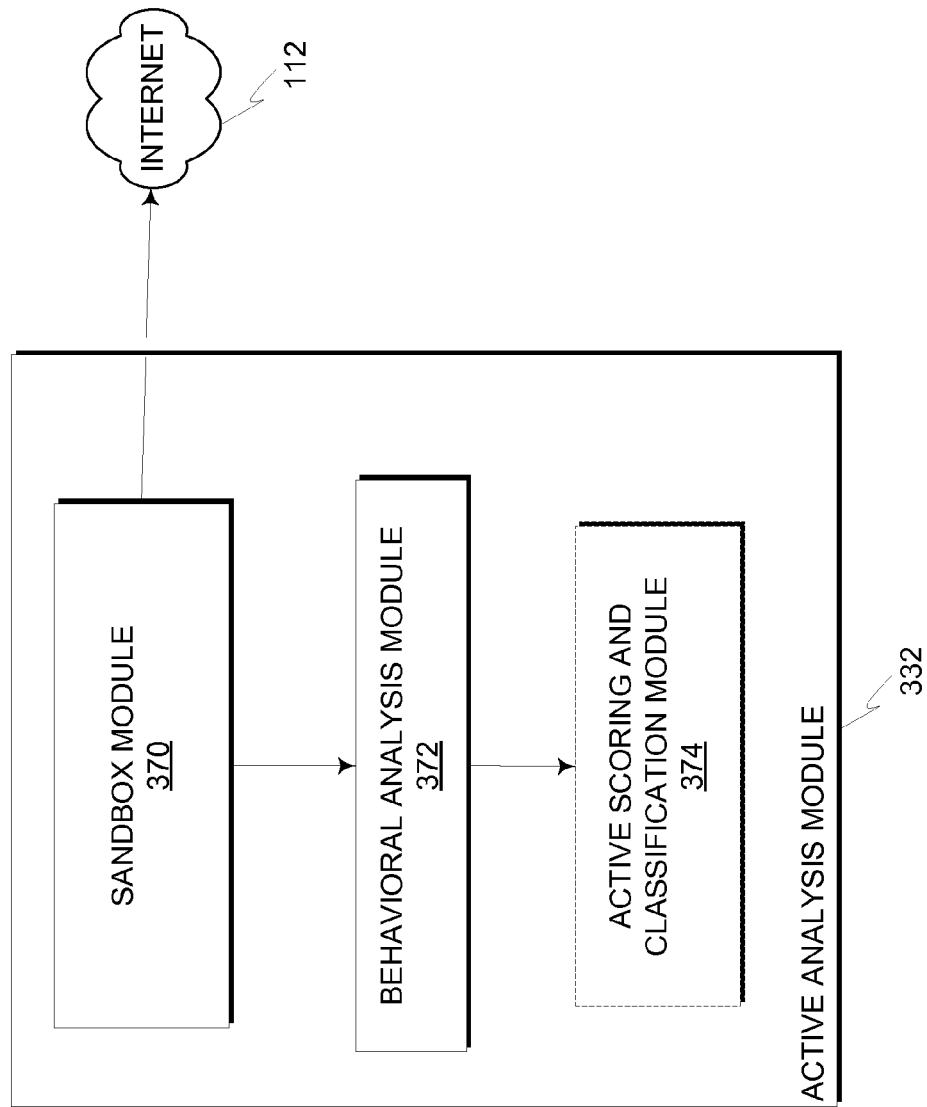
FIG. 15 is a block diagram illustrating one embodiment of an active analysis system from FIG. 12.

FIG. 15 is a block diagram illustrating one embodiment of the active analysis module 332 from FIG. 12. In one embodiment, the active analysis module 332 includes a sandbox module 370 in which URLs are downloaded and any active content executed as would occur on a typical workstation 116. The sandbox module 370 transparently monitors the state of the computer to identify behavior of the web content affecting, for example, one or more of spawned processes, network access, processor usage, memory usage, use of system resources, file system access or modification, and registry access or modification.

A behavioral analysis module 372 compares the monitored actions from the sandbox module with a list, a database, or rules that characterize the monitored actions. In one embodiment, these characterizations define properties of the URL that are subsequently analyzed by the static content classification module 328 of FIG. 12. In another embodiment, an active scoring classification module 374 may use scores associated with behavioral properties to determine a score for the URL. In one embodiment, the score is a weighted score of these properties. This score may be used to classify the URL or be communicated to the content scoring module for classification. In another embodiment, rules or definitions, such as those from the definitions database 332 are applied to the behavioral properties of the URL (and, in one embodiment, the processed web page properties 324) to identify one or more categories associated with the URL.

Description of Methods of Use and Operation

Depending on the embodiment, the acts or events of the methods described herein can be performed in different sequences, can be merged, or can be left out all together (e.g., not all acts or events are necessary for the practice of the method), unless the text specifically and clearly states otherwise. In addition, the methods described herein can include additional acts or events unless the text specifically and clearly states otherwise. Moreover, unless clearly stated otherwise, acts or events may be performed concurrently, e.g., through interrupt processing or multiple processors, rather than sequentially.

Figure 16:
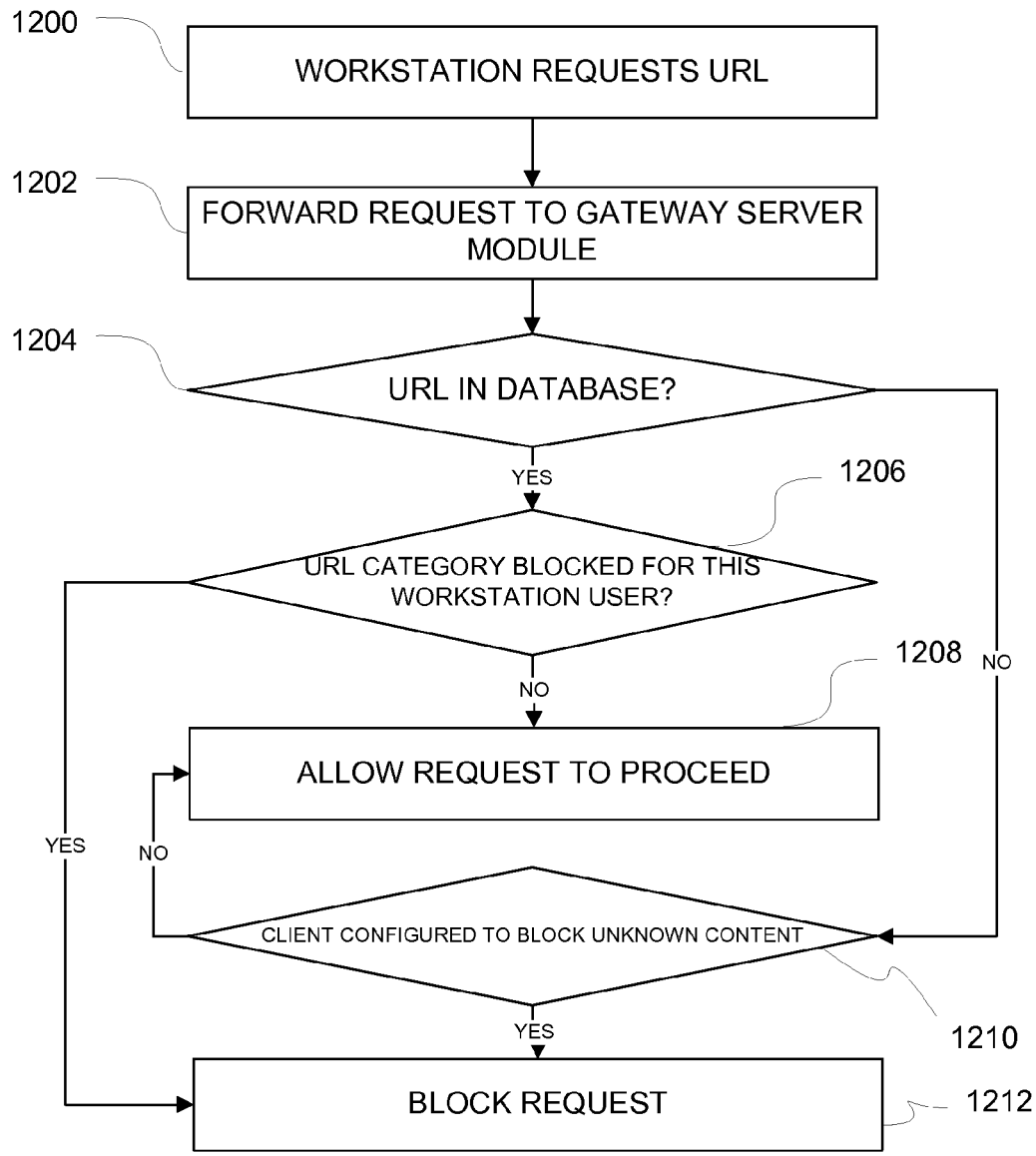
FIG. 16 is a flowchart describing how URLs may be handled in the gateway server module in one embodiment.

As discussed above in connection with FIG. 3, in some embodiments, the gateway server module 120 may be configured to control access to certain URLs based on data stored in the categorized URL database 146. FIG. 16 is a flowchart describing an embodiment in which the gateway server module handles a request from a workstation 116.

At block 1200, the workstation 116 requests a URL from the Internet 112. This request is intercepted at the Internet gateway and forwarded to the gateway server module 120 at block 1202. At block 1204, the categorized URL database 146 is queried to determine if the requested URL is stored in the database 146. If the requested URL is found as a record in the database, the process moves on to block 1206, where it analyzes the URL record to determine whether the category of the URL is one that should be blocked for the workstation user. If the category is blocked, the process skips to block 1212 and the request is blocked. If the category is not blocked, however, the request is allowed at block 1208.

If the requested URL is not found as a record in the categorized URL database 146 at block 1204, the system proceeds to block 1210. At block 1210, the system determines how to handle the uncategorized content. In some embodiments, the system may utilize the policy module 142 to make this determination. If the gateway server module 120 is configured to block requests for uncategorized content, the process moves to block 1212, and the request is blocked. If, on the other hand, the module is configured to allow these types of uncategorized requests, the process moves to block 1208, where the request is allowed to proceed to the Internet 112.

In some embodiments, the request of URL data may result in new records being added to the logging database 144.

Figure 17:
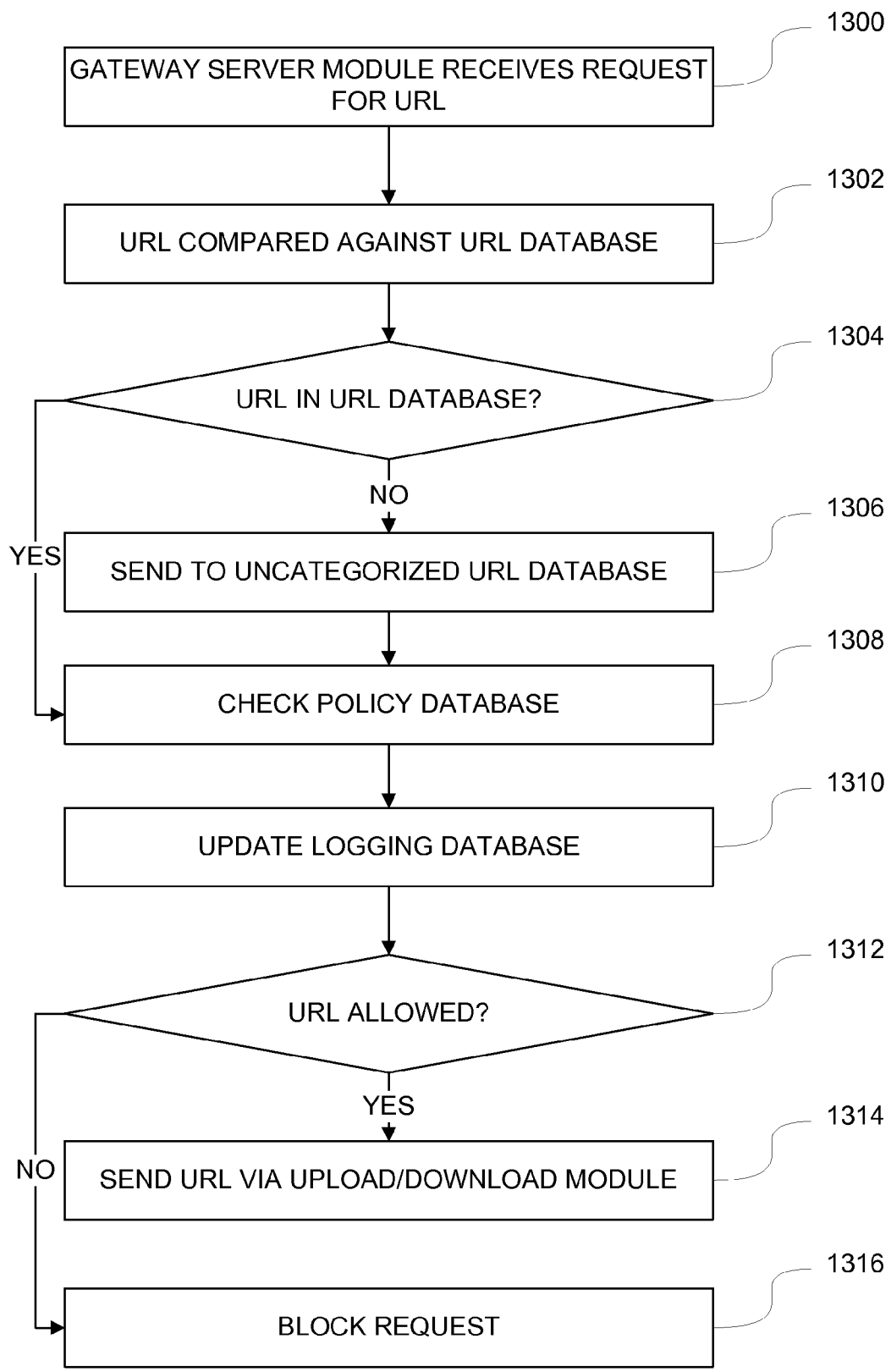
FIG. 17 is a flowchart describing how URLs may be handled by the gateway server module in conjunction with the policy module according to certain embodiments.

These records may be later transferred to the database management module 114 for further analysis. Referring now to FIG. 17, another flowchart describing a process by which the gateway server module may handle a URL request is provided. At block 1300, the gateway server module 120 receives a request for a URL. As noted above, this request may come from a workstation 116. At block 1302, the URL is then compared against the categorized URL database 146, and the system determines at block 1304 whether the requested URL is in the categorized URL database.

If the URL is already in the categorized URL database 146, the process skips to block 1308. If the requested URL is not found in the categorized URL database 146, however, the process moves to block 1306 where the URL is inserted into the uncategorized URL database 147. (In some embodiments, the logging database 144 and the uncategorized URL 147 database may be the same database.) After inserting the URL into the database, the method proceeds to block 1308. At block 1308, the policy database is checked for instructions on how to handle the received URL. Once the policy module 142 has been checked, the logging database 144 is updated to record that the URL has been requested at block 1310. After updating the logging database 144, if the workstation 116 is permitted to access the URL by the policy database, the process moves to block 1314 and the URL request is sent to the Internet 112. If, however, the policy database does not allow the request, the process skips to block 1316 and the request is blocked.

Figure 18:
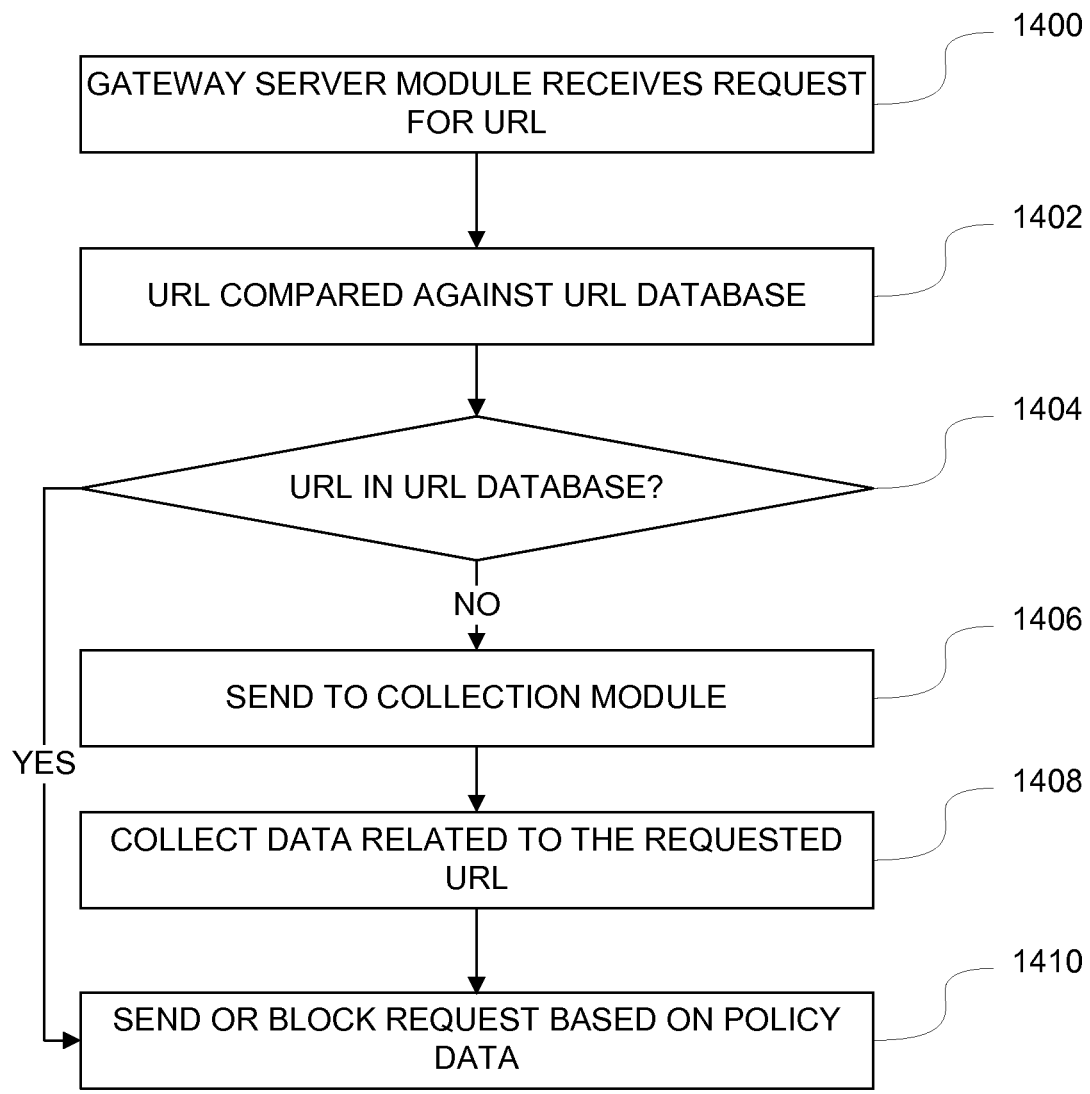
FIG. 18 is a flowchart describing the how the collection system may handle a URL within the gateway server module.

In some embodiments, the gateway server module 120 may perform collection activities to lessen the burden on the collecting system 182 of the database management module 114. FIG. 18 provides an example of a system in which the gateway server collection module 140 is used to collect data about an uncategorized URL. At block 1400, the gateway server module receives a request for a URL. Next, at block 1402, the requested URL is compared against the categorized URL database. If the system determines that the requested URL is in the URL database at block 1404, the process moves to block 1410, where the request is either forwarded to the Internet 112 or blocked depending on how the URL is categorized.

If the requested URL is not in the categorized URL database 146, the process moves to block 1406 where the URL is sent to the gateway collection module 140. Next, at block 1408, the collection module 140 collects URL data about the requested URL. In some embodiments, this data may be stored in the uncategorized URL database 147. Alternatively, this data may simply be forwarded to the database management module 114 via the Internet 112. Once the data has been collected and stored, the process moves to block 1410 where the URL request is either allowed or blocked based on the policies indicated in the policy module 142.

As discussed previously, uncategorized URL data may be sent from the gateway server module 120 to the database management module 114 for further analysis so that the URL may be categorized and added to the categorized URL database 146. However, because the volume of uncategorized data is so large at times, it may not be possible to categorize all of the received data without compromising accuracy or speed. As a result, in some instances, it may be desirable to identify candidate URLs within the uncategorized data that are most likely to present a threat to workstations 116 and networks 110.

Figure 19:
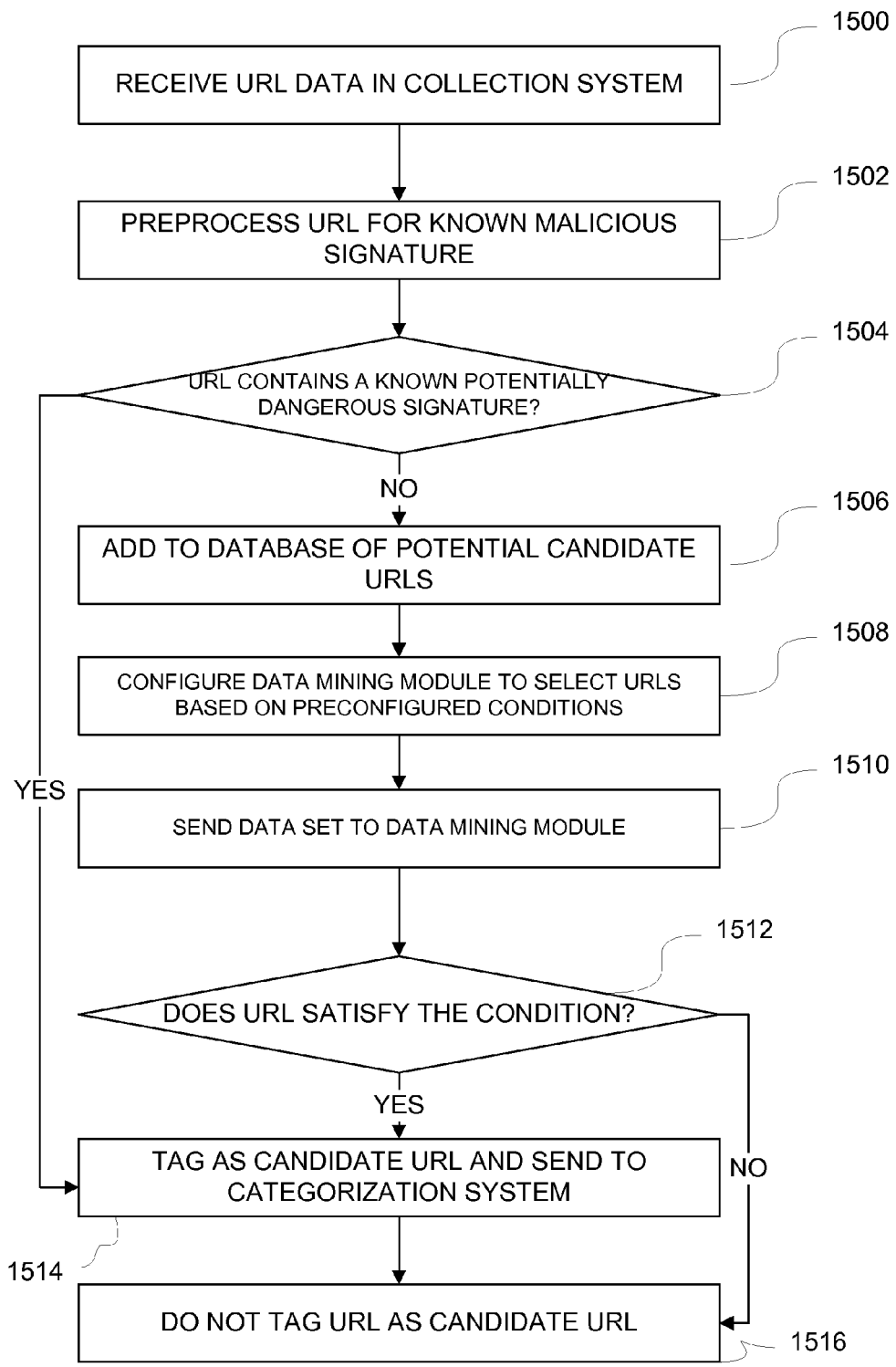
FIG. 19 is a flowchart describing the how the collection system may handle a URL within the database management module.

FIG. 19 provides an example of a method for identifying candidate URLs for further analysis. The method starts with a URL being received into the collection system 182 of the database module 114. At block 1502, the URL or application is preprocessed to determine whether it carries a known malicious data element or data signature. Next, at block 1504, if the system determines that the URL includes a known malicious element, the process skips to block 1514 where the URL is tagged as a candidate URL and sent to the training system 184 for further analysis. If the initial analysis of the URL in block 1504 does not reveal a malicious element, the process moves to block 1506, where the URL is added to a database of potential candidate URLs. Next, at block 1508, the data mining module 192 is configured to select URLs from sources 194 (of which the database of potential candidate URLs is one) based on preconfigured conditions such as attack strings, virus signatures, and the like. The data set including all of the data sources 194 is then sent to the data mining module 192 at block 1510, where each URL is analyzed by the data mining module 192 at block 1512. If the URL satisfies the defined preconfigured conditions, the process moves to bock 1514 where the URL is tagged as a candidate URL and sent on to the scoring/classification system 186 for additional analysis. If, however, the URL does not meet the conditions specified for converting it to a candidate URL, the method proceeds to block 1516 and the URL is not tagged as a candidate. Although this embodiment is described in the context of URL candidate classification, one of skill in the art will readily appreciate that applications may be similarly analyzed and tagged as candidates using the process described above.

Figure 20:
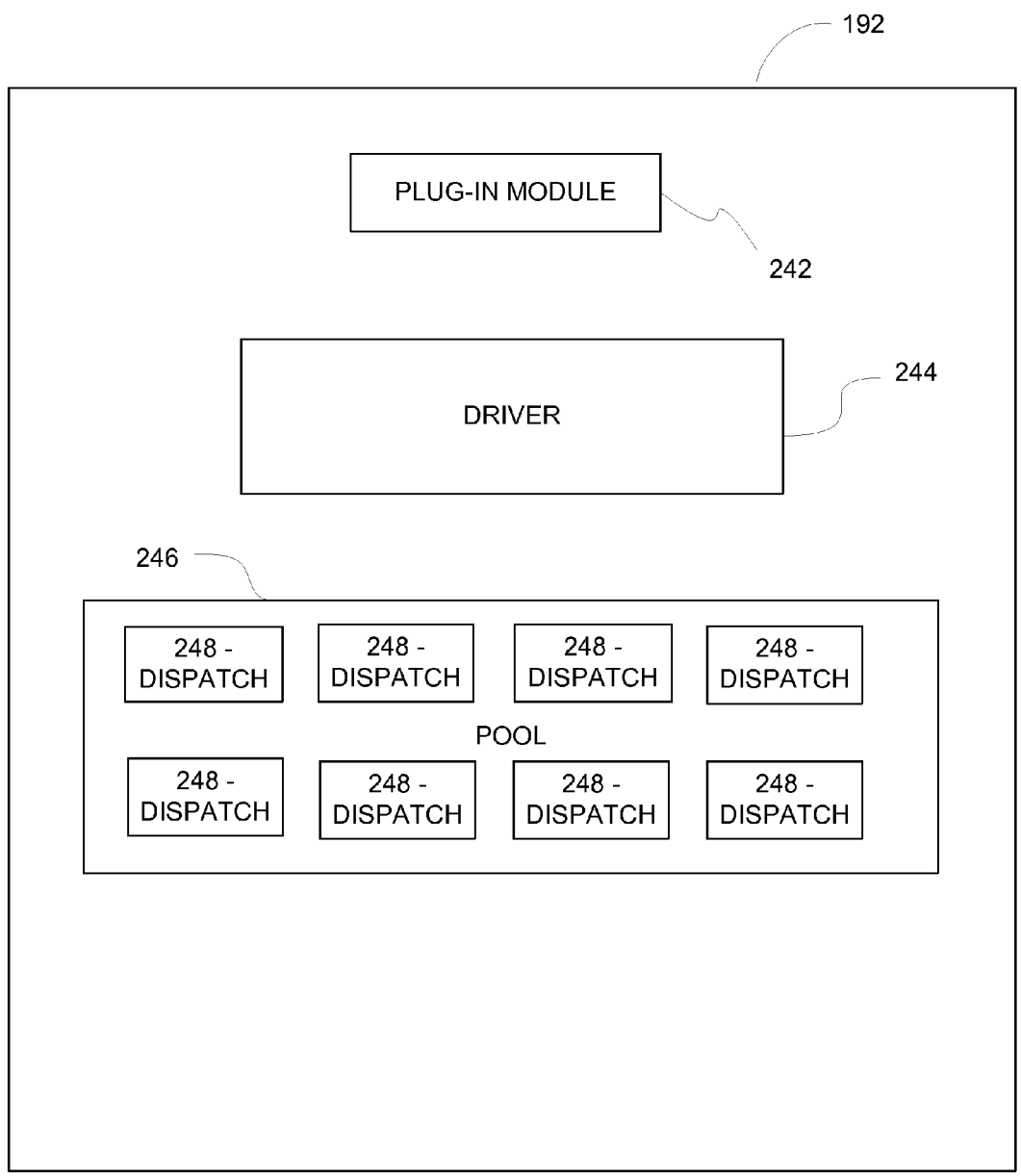
FIG. 20 is a block diagram of a data mining system.

As discussed above, one of the challenges to collecting and analyzing Internet data to determine whether it includes harmful active content is the sheer volume of data that must be collected and analyzed. In yet another embodiment, the data mining module 192 may be used to address these issues by collecting large volumes of relevant data utilize system resources effectively and efficiently. Referring now to FIG. 20, a more detailed block diagram of the data mining system 192 is provided. The data mining system 192 may take the form of a software module that runs a plurality of asynchronous processes to achieve maximum efficiency and output. The data mining system 192 may include a plug-in module 242 which receives configuration parameters which provide instruction on how inputted data should be handled. In one embodiment, the instructions received by the plug-in module may take the form of an HTTP protocol plug-in that provide parameters for the data mining system 192 to receive URL data and analyze and supplement the data based on various HTTP-related instructions implemented by the data mining system on the URL data. In another embodiment, the plug-in may be geared toward mining some other protocol such as FTP, NNTP, or some other data form.

The data mining system 192, which may also be used to implement passive honey clients, also include a pool 246 of dispatchers 248. The dispatchers 248 are individual asynchronous processing entities that receive task assignments based on the data input (for analysis) into the data mining system and the configuration data received by the plug-in module 242. The pool 246 is a collection of the dispatchers that is controlled by a driver 244. The driver 244 is a managing mechanism for the pool. The driver 244 may be configured to monitor the activity of the dispatchers 248 in the pool 246 to determine when to send additional data into the pool 246 for mining and analysis. In one embodiment, the driver may be configured to send new data units into the pool 246 whenever any dispatchers 248 are idle. In one embodiment, the driver 244 may be utilized as a control server for managing honey-client miners 222 as described above in connection with FIG. 10. The pool 246 may deliver the data unit to the idle dispatcher 248. The dispatcher 248 reads the plug-in configuration and performs actions in accordance with plug-in 242.

In one embodiment, the plug-in module may receive an HTTP plug-in. The HTTP plug-in may be configured to receive input data in the form of URL strings about which the data mining system 192 will obtain addition information such as the page content for the URL, HTTP messages returned by the URL when accessed (such as "4xx-file not found" or "5xx-server error"). The plug-in may further specify a web-crawling mode in which the dispatches, in addition to collecting page content, also add URL links within the URL content to the URL data set to be analyzed.

Figure 21:
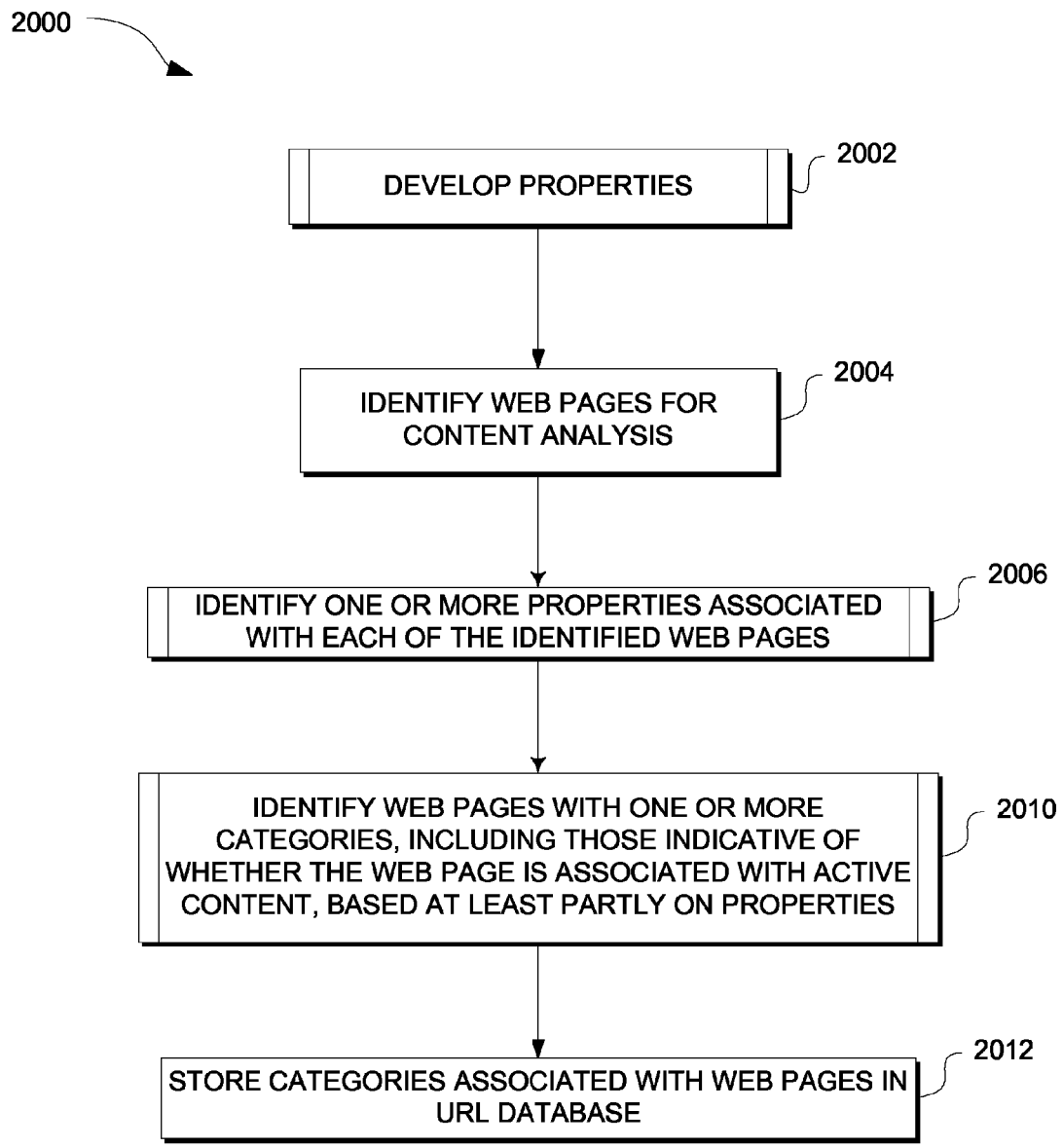
FIG. 21 is a flowchart illustrating one embodiment of a method of categorizing URLs within the database management module.

FIG. 21 is a flowchart illustrating one embodiment of a method 2000 of categorizing URLs within the database management module 114. The method 2000 begins at a block 2002 in which properties are developed that can be used to categorize web pages. In one embodiment, the training module 184 is used to develop the properties in the properties database 320. In one embodiment, developing the properties includes developing definitions, e.g., expressions relating one or more properties, and storing the definitions in the definitions database 326. Next at a block 2004, web pages are identified for content analysis. In one embodiment, the collections module 190 identifies web pages for content analysis. In one embodiment, web pages having properties or other indicia of active content are identified for content analysis.

Moving to a block 2006, the content analysis module 322 identifies one or more properties associated with each of the identified web pages. Functions of block 2006 are described in more detail hereafter with reference to FIG. 22. Proceeding to a block 2010, the static content classification module 328 identifies web pages with one or more categories based at least partly on properties. In one embodiment, the static content classification module 328 compares definitions from the definitions database 326 with the properties of each web page to identify its properties. In one embodiment, the categories include those indicative of whether the web page is associated with active content. In one embodiment, the categories include those indicative of types of active content, e.g., malicious, phishing sites, keyloggers, viruses, worms, etc., associated with or referenced by the web page. In one embodiment, the active content is included in the body of the web page. In one embodiment, the active content is referenced in a link or ActiveX object element of the web page. In one embodiment, active content includes interactive "phishing" sites that include content tending to mislead users into providing credentials or other sensitive, private, or personal information. In one embodiment, the scoring module 330 further scores and classifies the web pages. Moving to a block 2012, the categories associated with the web pages are stored in the URL database. In one embodiment, the upload download module 178 of FIG. 7 distributes the new URL categories to one or more gateway server modules 120 or workstations 116 (both of FIG. 1). In one embodiment, one or more blocks of the method 2000, e.g., blocks 2006-2012, may be performed either continuously as new URLs are received by the collections module 190. In one embodiment, one or more blocks of the method 2000, e.g., blocks 2006-2012, may be performed periodically.

Figure 22:
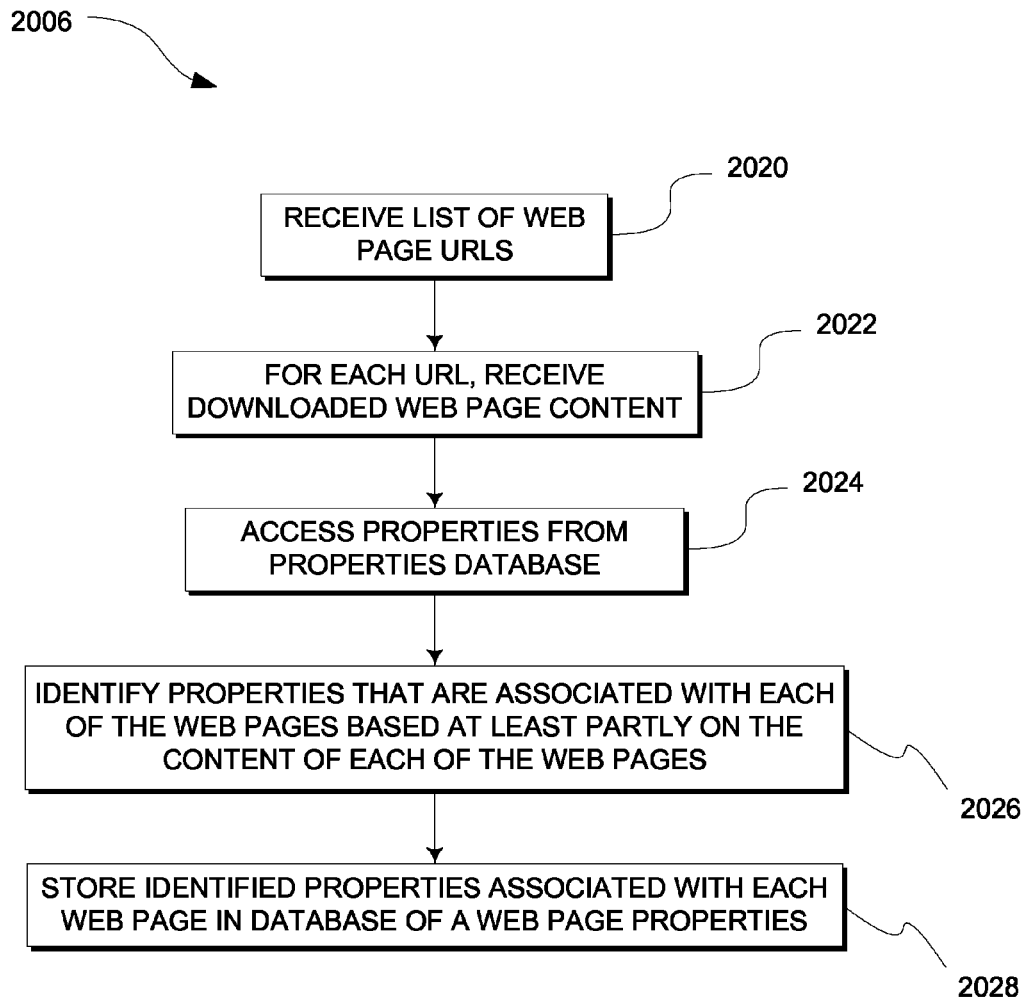
FIG. 22 is a flowchart illustrating one embodiment of a method of identifying properties of a URL in the method of FIG. 21.

FIG. 22 is a flowchart illustrating one embodiment of a method of performing the function of the block 2006 of FIG. 21. The method begins at a block 2020 in which the content analysis module 322 receives a list of web page URLs in the URL database 180. In one embodiment, the collection module 190 provides the list of candidate URLs. Next at a block 2022, for each URL, the content analysis module 322 receives downloaded web page content. In one embodiment, the collection module 190 downloads the content and stores it in the URL database 180 from which the content analysis module 322 accesses the content. In another embodiment, the content analysis module 322 downloads and processes the content. Moving to a block 2024, the content analysis module 322 accesses properties from the properties database 320. Next at a block 2026, the content analysis module 322 identifies properties that are associated with each of the web pages based at least partly on the content of each of the web pages. In one embodiment, the content analysis module 322 scans the content to identify string, keyword and regular expression properties from the properties database 320. In one embodiment, the content analysis module 322 may also decode content prior to, and/or after, scanning for properties. For example, the content analysis module 322 may decode web content such as URL-encoded portions of URLs or hex-coded web addresses prior to scanning to help prevent keywords from being hidden by encoding or partially encoding the keywords. Proceeding to a block 2028, the content analysis module 322 stores the identified properties associated with each web page in the processed web page properties database 324.

Figure 23:
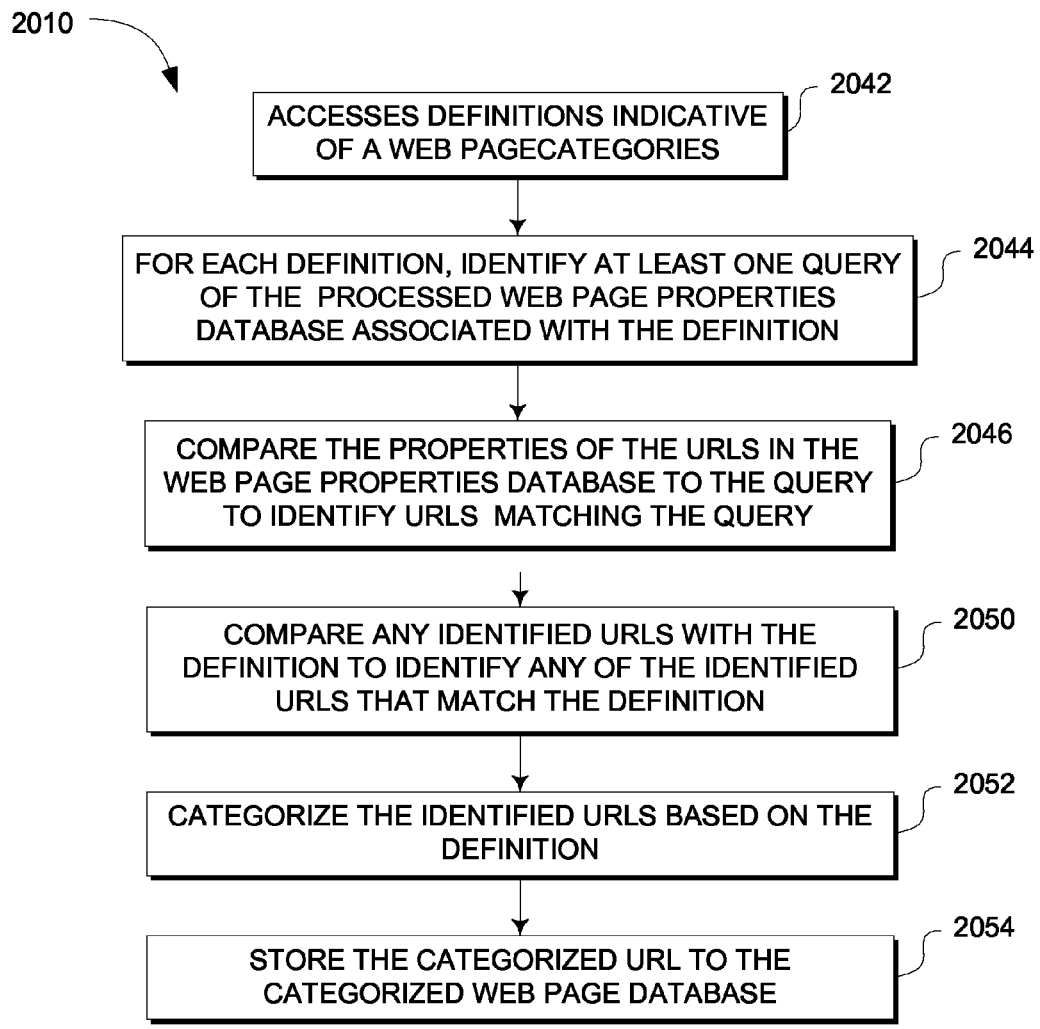
FIG. 23 is a flowchart illustrating one embodiment of a method of categorizing URLs based on URL properties in the method of FIG. 21.

FIG. 23 is a flowchart illustrating one embodiment of a method of performing the function of the block 2010 of FIG. 21. The method begins at a block 2042 in which the static content classification module 328 accesses definitions indicative of web page categories from the definitions database 326. Next at a block 2044, for each definition, the static content classification module 328 identifies one or more queries associated with each definition against the processed web page properties database 324. In one embodiment, the queries comprises SQL queries.

Moving to a block 2046, the static content classification module 328 compares the properties of the URLs in the web page properties database to the query to identify URLs matching the query. In one embodiment, the static content classification module 328 performs the comparison by executing the one or more identified database queries against the processed web page properties database 324. Next at a block 2050, the static content classification module 328 compares any identified URLs with the definition to identify any of the identified URLs that match the definition. In one embodiment, this comparison includes comparing the results of the database query using additional executable instructions, such as a Perl script, to identify matching URLs. Proceeding to a block 2052, the static content classification module 328 categorizes the identified URLs based on the definition. In one embodiment, each definition is associated with a single category. In another embodiment, each definition is associated with several categories that are each identified with the URL. In yet another embodiment, the definition may include logical expresses that identify one or more categories to identify with the URL. For example, an if-then-else expression may identify different categories depending on the result of the if expression. In one embodiment, the content scoring module further scores the URL. Based on the score, the same, different, or additional categories may be identified with the URL. Next at a block 2054, the static content classification module 328 stores the categories of each URL to a categorized web page database. In one embodiment, the URL database 180 includes the categorized web page database.

Figure 24:
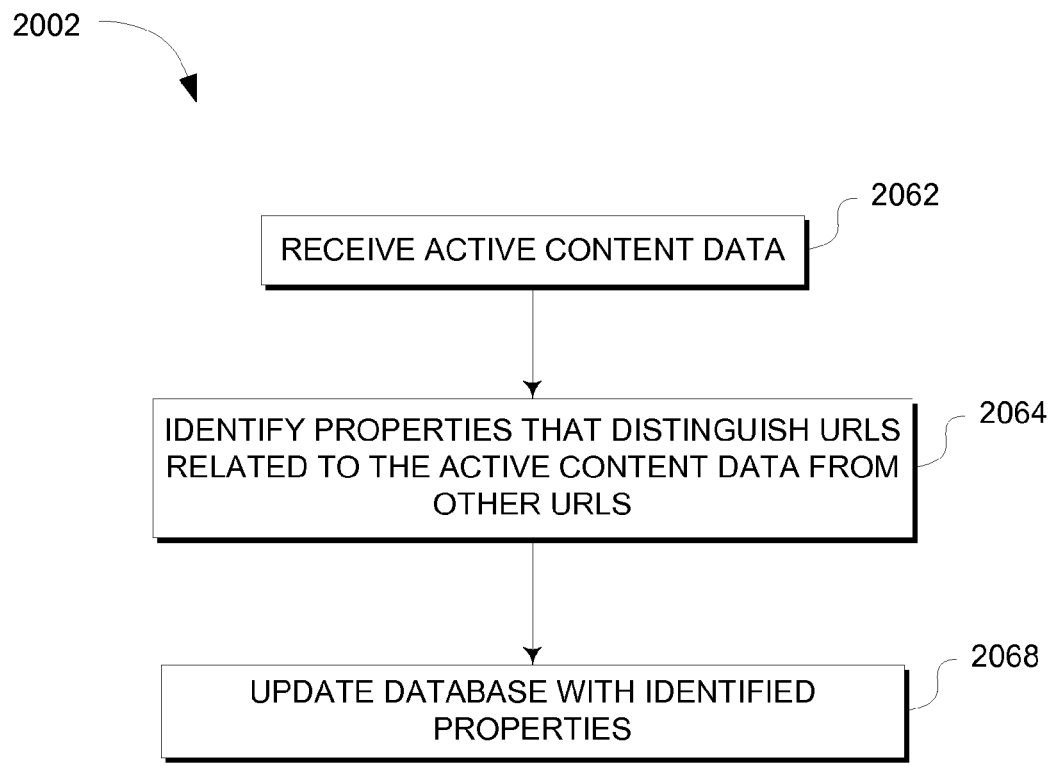
FIG. 24 is a flowchart illustrating one embodiment of a method of identifying properties used in categorizing URLs in the methods of FIGS. 22 and 23.

FIG. 24 is a flowchart illustrating one embodiment of a method of performing the function of the block 2002 of FIG. 21 as part of identifying the properties used in categorizing URLs in the methods of FIGS. 22 and 23. The method begins at a block 2062 in which the analysis tasking module 352 of FIG. 14 receives active content data or URLs associated with active content. Next at a block 2064, property identification module 254 identifies properties that distinguish the target URLs related to the active content data from other URLs and identify one or more categories associated with the target URLs. In one embodiment, the scoring and classification system 186 is used to help identifies these properties. In addition, definitions comprising one or more of the properties may be identified that distinguish the target URLs that are associated with a particular category from other URLs that should not be associated with that category. Moving to a block 2068, the database update module 356 stores the properties, definitions, and categories in the properties database 320 and the definitions database 326. These updated properties and definitions are thus made available for processing URLs using, for example, the method illustrated in FIG. 21.

As used herein, "database" refers to any collection of stored data stored on a medium accessible by a computer. For example, a database may refer to flat data files or to a structured data file. Moreover, it is to be recognized that the various illustrative databases described in connection with the embodiments disclosed herein may be implemented as databases that combine aspects of the various illustrative databases or the illustrative databases may be divided into multiple databases. For example, one or more of the various illustrative databases may be embodied as tables in one or more relational databases. Embodiments may be implemented in relational databases, including SQL databases such as mySQL, object oriented databases, object-relational databases, flat files, or any other suitable data storage system.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the above, one will appreciate that embodiments of the invention overcome many of the longstanding problems in the art by providing an efficient means of processing the large numbers of URLs that are available on the Internet to identify categories for URLs, particularly those that have active content. URLs having many types of active content may be difficult even for a human analyst to categorize because the relevant properties may be buried in executable code, including scripts, or in parameters to ActiveX components. The use of properties and definitions that can be efficiently processed allows ActiveX content to be effectively identified by an automatic process. Furthermore, by storing the properties of web pages in a database for later querying, large numbers of URLs can immediately be categorized based on these stored properties when a new definition of active content is identified.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of classifying web content, implemented on one or more computer processors, the method comprising:
   using at least one of the processors, receiving content of a web page;
   using at least one of the processors, determining a first property associated with the content of the web page, the first property comprising static content associated with the web page;
   using at least one of the processors, executing active content associated with the webpage;
   using at least one of the processors, determining a second property associated with the content of the web page based at least in part on the executing, the second property comprising the active content;
   using at least one of the processors, evaluating a logical expression relating the first property and the second property; and
   using at least one of the processors, associating the web page with a category based on a result of the evaluation,
   wherein the evaluation of the logical expression at least in part evaluates whether a constant value matches at least a portion of the content of the web page.

2. The method of claim 1, wherein executing the active content comprises executing the active content in a sandbox environment.

3. The method of claim 1, wherein determining the first property associated with content of the web page comprises identifying a keyword in the content of the web page.

4. The method of claim 1, wherein the first property is associated with a regular expression matching at least a portion of the content of the web page.

5. The method of claim 1, wherein the first property includes an indication of a number of occurrences of a string within the web page.

6. The method of claim 1, wherein evaluating the logical expression comprises relating each of the first and second properties to corresponding constant values, and wherein the method further comprises assigning the category to the web page if the evaluated logical expression corresponds to a predetermined value.

7. The method of claim 6, wherein relating the first property to its corresponding constant value comprises evaluating a regular expression based on a content of the web page, and relating the result of the evaluation to the corresponding constant value.

8. The method of claim 1, further comprising:
evaluating a plurality of logical expressions based on the content of the web page, wherein each of the logical expressions relate the first property and the second property, wherein each of the plurality of logical expressions corresponds to a web page category; and
associating the web page with a logical expression's corresponding category if the evaluated logical expression corresponds to a predetermined value.

9. A system for classifying web content, the system comprising:
one or more hardware processors configured, individually or in combination, to:
receive content of a web page;
determine a first property associated with the content of the web page, the first property comprising static content associated with the web page;
determine a second property associated with the content of web page based at least in part by executing active content associated with the webpage, the second property comprising the active content;
evaluate a logical expression relating the first property and the second property; and
associate the web page with a category based on a result of the evaluation,
wherein the evaluation at least in part evaluates whether a constant value matches at least a portion of the content of the web page.

10. The system of claim 9, wherein the one or more processors are further configured, individually or in combination, to execute the active content in a sandbox environment.

11. The system of claim 9, wherein the one or more processors are further configured, individually or in combination, to determine the first property of the web page at least in part by identifying a keyword in the content of the web page.

12. The system of claim 9, wherein the first property is associated with a regular expression matching at least a portion of the content of the web page.

13. The system of claim 9, wherein the first property includes an indication of a number of occurrences of a string within the web page.

14. The system of claim 9, wherein evaluating the logical expression comprises relating each of the first and second properties to corresponding constant values, and wherein the one or more processor are further configured to assign the category to the web page if the evaluated logical expression corresponds to a predetermined value.

15. The system of claim 14, wherein relating the first property to its corresponding constant value comprises evaluating a regular expression on a content of the web page, and relating the result of the evaluation to the corresponding constant value.

16. The system of claim 9, wherein the one or more processors are further configured, individually or in combination, to:
evaluate a plurality of logical expressions based on the content of the web page, wherein each of the logical expressions relates the first property and the second property, and wherein each of the plurality of logical expressions corresponds to a web page category; and
associate the web page with a logical expression's corresponding category if the evaluated logical expression corresponds to a predetermined value.

17. An apparatus for classifying web content, implemented on one or more computer processors, comprising:
means for determining a first property associated with content of a web page, the first property comprising static content associated with the web page;
means for executing active content associated with the webpage;
means for determining a second property associated with the content of the web page based at least in part on the executing, the second property comprising the active content;
means for evaluating a logical expression relating the first property and the second property; and
means for associating the web page with a category based on a result of the evaluation,
wherein the means for evaluating a logical expression relating the first' property and the second property is configured to evaluate whether a constant value matches at least a portion of the content of the web page.

18. The apparatus of claim 17, wherein the means for associating the web page with a category based on a result of the evaluation comprises one or more hardware processors.

* * * * *